US006557889B2

(12) United States Patent
Breed

(10) Patent No.: US 6,557,889 B2
(45) Date of Patent: May 6, 2003

(54) CRUSH VELOCITY SENSING VEHICLE CRASH SENSOR

(75) Inventor: David S. Breed, Boonton Township, Morris County, NJ (US)

(73) Assignee: Automotive Technologies International Inc., Denville, NJ (US)

( * ) Notice: Subject to any disclaimer, the term of this patent is extended or adjusted under 35 U.S.C. 154(b) by 83 days.

(21) Appl. No.: 09/862,530

(22) Filed: May 22, 2001

(65) Prior Publication Data

US 2001/0028163 A1 Oct. 11, 2001

Related U.S. Application Data

(63) Continuation-in-part of application No. 09/452,735, filed on Dec. 1, 1999, which is a continuation-in-part of application No. 08/358,976, filed on Dec. 19, 1994, now Pat. No. 6,009,970, which is a continuation of application No. 08/104,246, filed on Aug. 9, 1993, now abandoned, which is a continuation of application No. 07/727,756, filed on Jul. 9, 1991, now abandoned, and a continuation-in-part of application No. 09/748,489, filed on Dec. 26, 2000, which is a continuation of application No. 08/514,986, filed on Aug. 14, 1995, now Pat. No. 6,206,129, which is a continuation-in-part of application No. 08/024,076, filed on Mar. 1, 1993, now Pat. No. 5,441,301, which is a continuation-in-part of application No. 07/795,035, filed on Nov. 20, 1991, now Pat. No. 5,326,133, which is a continuation-in-part of application No. 07/727,756, filed on Jul. 9, 1991, now abandoned.

(51) Int. Cl.$^7$ ................................................ B60R 21/32

(52) U.S. Cl. ..................................................... 280/735

(58) Field of Search ............................... 280/735; 701/45

(56) References Cited

U.S. PATENT DOCUMENTS

| 2,437,969 | A | 3/1948 | Paul ........................... 200/86 R |
| 3,495,675 | A | 2/1970 | Hass et al. | |
| 3,694,000 | A | 9/1972 | Koenig ...................... 200/86 R |
| 3,701,903 | A | 10/1972 | Merhar ........................ 307/9.1 |
| 3,748,373 | A | 7/1973 | Remy .......................... 174/115 |
| 3,768,831 | A | * 10/1973 | Wesselman et al. .. 280/150 AB |
| 3,853,199 | A | 12/1974 | Hirashima et al. ............ 180/91 |
| 3,859,482 | A | 1/1975 | Matsui et al. ............ 200/61.08 |
| 3,874,695 | A | 4/1975 | Abe et al. .................... 280/735 |
| 3,889,232 | A | * 6/1975 | Bell ......................... 340/52 H |
| 3,974,350 | A | 8/1976 | Breed ....................... 200/61.53 |
| 4,060,705 | A | 11/1977 | Peachey ................... 200/86 R |
| 4,198,864 | A | 4/1980 | Breed .......................... 73/492 |
| 4,284,863 | A | 8/1981 | Breed ...................... 200/61.53 |

(List continued on next page.)

OTHER PUBLICATIONS

Problems in Design and Engineering of Air Bag Systems, Society of Automotive Engineers, David S. Breed et al., Paper No. 880724, Feb. 29–Mar. 4, 1988.

Trends in Sensing Frontal Impacts, Society of Automotive Engineers, David S. Breed et al., Paper No. 890750, Feb. 27–Mar. 3, 1989.

Trends in Sensing Side Impacts, Society of Automotive Engineers, David S. Breed et al., Paper No. 890603, Feb. 27–Mar. 3, 1989.

(List continued on next page.)

Primary Examiner—Eric Culbreth
Assistant Examiner—L. Lum

(57) ABSTRACT

Crash sensor arrangement for determining whether a crash involving a vehicle requires deployment of an occupant restraint device including an elongate sensor arranged in the crush zone to provide a variable impedance as a function of a change in velocity of the crush zone and a processor for measuring the impedance of the sensor or a part thereof at a plurality of times to determine changes in the impedance. The processor provides a crash signal for consideration in the deployment of the occupant restraint device based on the determined changes in impedance. The sensor can have a U-shaped portion extending along both sides of the vehicle and across a front of the vehicle. The sensor may have a coaxial cable and an electromagnetic wave generator which generates electromagnetic waves and feeds the waves into the cable.

22 Claims, 22 Drawing Sheets

U.S. PATENT DOCUMENTS

| | | | |
|---|---|---|---|
| 4,329,549 A | 5/1982 | Breed | 200/61.45 M |
| 4,573,706 A | 3/1986 | Breed | 280/734 |
| 4,762,970 A | 8/1988 | Brinsley | 200/86 R |
| 4,900,880 A | 2/1990 | Breed | 200/61.45 M |
| 4,977,388 A | 12/1990 | Park | 340/436 |
| 4,995,639 A | 2/1991 | Breed | 280/735 |
| 5,031,931 A | 7/1991 | Thuen et al. | 280/735 |
| 5,231,253 A | 7/1993 | Breed et al. | 200/61.45 R |
| 5,322,323 A | 6/1994 | Ohno et al. | 280/735 |
| 5,326,133 A | 7/1994 | Breed et al. | 280/735 |
| 5,363,302 A | 11/1994 | Allen et al. | 364/424.05 |
| 5,390,951 A | 2/1995 | Iyoda | 280/735 |
| 5,441,301 A | 8/1995 | Breed et al. | 280/735 |
| 5,694,320 A | 12/1997 | Breed | 364/424.055 |

OTHER PUBLICATIONS

Are Barrier Crashes Sufficient for Evaluating Air Bag Sensor Performance?, Society of Automotive Engineers, David S. Breed et al., Paper No. 900548, Feb. 26–Mar. 2, 1990.

Characterization of the Cross–Axis Acceleration Crash Sensor Environment and Test Method, Society of Automotive Engineers, F. Shokoohi et al., Paper No. 930651, Mar. 1–5, 1993.

The Inertial Flow Crash Sensor and its Application to Air Bag Deployment, David S. Breed et al., Twelfth International Technical Conference on Experimental Safety Vehicles, Sweden, May 29–Jun. 1, 1989.

A Critique of Single Point Sensing, Society of Automotive Engineers, David S. Breed et al., Paper No. 920124, Feb. 24–28, 1992.

Using Vehicle Deformation to Sense Crashes, David S. Breed et al., Presented at the International Body Engineering Conference, Sep. 21–23, 1993.

Side Impact Airbag System Technology, David S. Breed, Presented at the International Body Engineering Conference, Sep. 26–29, 1994.

A Complete Frontal Crash Sensor System, Society of Automotive Engineers, David S. Breed et al., Paper No. 930650, Mar. 1–5, 1993.

A Complete Frontal Crash Sensor System–II, Proceedings of the Enhanced Safety of Vehicle Conference, Munich, Germany, 1994, Published by the U.S. Dept. of Trans. National Highway Safety Administration, Washington, D.C., pp. 1377–1387.

Performance of a Crush Sensor for Use with Automotive Air Bag Systems, Society of Automotive Engineers, David S. Breed et al, Paper No. 920122, Feb. 24–28, 1992.

Sensing Side Impacts, Society of Automotive Engineers, David S. Breed et al., Paper No. 940561, Feb. 28–Mar. 3, 1994.

* cited by examiner

CRUSH VELOCITY SENSING VEHICLE CRASH SENSOR

CROSS REFERENCE TO RELATED APPLICATIONS

This application is a continuation-in-part of U.S. patent application Ser. No. 09/452,735 filed Dec. 1, 1999, now U.S. Pat No. 6,234,519 which is a continuation-in-part of U.S. patent application Ser. No. 08/358,976 filed Dec. 19, 1994, now U.S. Pat. No. 6,009,970, which in turn is a continuation of U.S. patent application Ser. No. 08/104,246 filed Aug. 9, 1993, abandoned, which in turn is a continuation of U.S. patent application Ser. No. 07/727,756 filed Jul. 9, 1991, abandoned.

This application is also a continuation-in-part of U.S. patent application Ser. No. 09/748,489 filed Dec. 26, 2000 which is a continuation of U.S. patent application Ser. No. 08/514,986 filed Aug. 14, 1995, now U.S. Pat. No. 6,206,129, which in turn is a continuation-in-part of U.S. patent application Ser. No. 08/024,076 filed Mar. 1, 1993, now U.S. Pat. No. 5,441,301, which in turn is a continuation-in-part of U.S. patent application Ser. No. 07/795,035 filed Nov. 20, 1991, now U.S. Pat. No. 5,326,133 which in turn is a continuation of U.S. patent application Ser. No. 07/727,756 filed July 9, 1991, abandoned, all of which are incorporated herein by reference.

FIELD OF THE INVENTION

This invention relates to arrangements and methods for controlling deployment of a vehicular occupant restraint device utilizing a plurality of crash sensors, at least one of which is mounted in the crush zone of the vehicle and another of which is mounted outside of the crush zone. In particular, this invention relates to a sensor that covers a wide area of the vehicle and is mounted in the front of the crush zone and measures the velocity change of the crush zone early in the crash.

This invention also utilizes improvements on the inventions disclosed in U.S. Pat. No. 4,995,639 (Breed) and a full discussion of the background of this general type of sensor is disclosed in that patent and included herein by reference.

BACKGROUND OF THE INVENTION

In Society of Automotive Engineers (SAE) paper No. 930650 entitled "A Complete Frontal Crash Sensor System—I", by Breed et al., which is incorporated herein by reference, the authors conclude that airbag crash sensors mounted in the crush zone are necessary for the proper sensing of airbag-required frontal crashes. They also conclude that such sensors should sense crashes to all portions of the front of the vehicle and that sensors which sense the crush of the vehicle are preferred. The theory of crush sensing is presented in the above-referenced U.S. patents and patent applications and in SAE paper No. 920122 entitled, "Performance of a Crush Sensor for Use with Automotive Airbag Systems", by Breed et al, which is incorporated herein by reference.

The tape switch and rod-in-tube crush sensors described in the above-referenced U.S. patents and patent applications have performed successfully on various staged vehicle frontal crashes into barriers and poles. These sensors are generally not sufficient for sensing side impacts as discussed in Breed, D. S., Sanders, W. T. and Castelli, V., "Sensing Side Impacts", Society of Automotive Engineers (SAE) paper No. 940561, 1994, however, they can be successful when used in conjunction with a passenger compartment mounted electronic sensor or as a safing sensor. Similarly, they are also being considered when a deployable device, such as an airbag, is used for rear impacts.

Three types of sensors have been widely used to sense and initiate deployment of an air bag passive restraint system. These sensors include an air damped ball-in-tube sensor such as disclosed in U.S. Pat. Nos. 3,974,350, 4,198,864, 4,284,863, 4,329,549 and 4,573,706 (all in the name of Breed), a spring mass sensor such as disclosed in U.S. Pat. Nos. 4,116,132 and 4,167,276 (both in the name of Bell) and an electronic sensor such as is now part of several air bag systems. Each of these sensors has particular advantages and shortcomings that were discussed in detail in U.S. Pat. No. 4,995,639 referenced above.

The use of tape or ribbon switch technology as a crush switch was also disclosed in the '639 patent. Further research has shown that an improvement of this particular implementation of the invention has significant advantages over some of the other implementations since the switch can be easily made long and narrow and it can be made to respond to bending. In the first case, it can be designed to cover a significant distance across the vehicle which increases the probability that it will be struck by crushed material or bent as the crush zone propagates rearward in the vehicle during a crash. In the second case, it can be made small and located to sense the fact that one part of the vehicle has moved relative to some other part or that the structure on which the sensor is mounted has deformed.

Other crush zone mounted crash sensors including crush switch designs where the width and height dimensions are comparable, must either be large and thus heavy, expensive and difficult to mount, or there is a possibility that the randomly shaped crushed material which forms the boundary of the crush zone will bridge the sensor resulting in late triggering. This crushed material frequently contains holes, wrinkles or folds or portions that may even be displaced or torn out during the crash with the result that it is difficult to guarantee that a particular small area where the sensor is mounted will be struck early in the crash.

A significant improvement results, therefore, if the sensor can stretch across more of the vehicle or if it can determine that there has been relative motion or deformation of a portion of the vehicle on which the sensor is mounted. The improved sensors described herein are small in height and thickness but can extend to whatever length is necessary to achieve a high probability of a sensor triggering on time in a crash.

It has been found that conventional designs of tape or ribbon switches have the drawback that the force required to close the switch is very small compared with the forces which are normally present in automobile crashes. During routine maintenance of the vehicle, the normal tape switch may be damaged or otherwise made to close and remain closed, with the result that later, when the vehicle encounters a pot hole or other shock sufficient to cause the arming sensor to close, an inadvertent air bag deployment can result. Similarly, if the tape switch is mounted on the front of the radiator support, which is a preferred mounting locating for crush zone sensors, hail, heavy rain, stones or other debris from the road might impact the tape switch and cause a momentary closure or damage it. If this happens when the vehicle experiences a shock sufficient to cause the arming sensor to close, an inadvertent air bag deployment might also occur. The force typically required to close a tape switch is less than one pound whereas tens of thousands of pounds are required to stop a vehicle in a crash and local forces greatly in excess of 20 pounds are available to actuate a sensor during a crash.

The present invention seeks to eliminate these drawbacks through the use of a tape switch, rod-in-tube or coaxial cable design that requires either a large force to actuate or a bending of the device due to structural deformation as explained below.

In 1992, the assignee of the current invention published a paper titled "A Critique of Single Point Sensing", SAE 920124, which is incorporated herein by reference, where the authors demonstrate that there is insufficient information in the non-crush zone of the vehicle to permit a decision to be made to deploy an airbag in time for many crashes. The crash sensors described herein and in the patents and patent applications referenced above, provide an apparatus and method for determining that the crush zone of the automobile has undergone a particular velocity change. This information can be used by itself to make the airbag deployment decision. As airbag systems become more sophisticated, however, the fact that the vehicle has undergone a velocity change in the crush zone can be used in conjunction with an electronic sensor mounted in the passenger compartment to not only determine that the airbag should be deployed but an assessment of the severity of the crash can be made. In this case, the front crush zone mounted sensor of the type disclosed herein can be used as an input to an electronic algorithm and thereby permit a deployment strategy based on the estimated severity of the accident. Although the sensors described herein are one preferred approach of providing this capability, the sensors disclosed in the above referenced patents would also be suitable. Alternately, in some cases, sensors of another design can fulfill this function. Such sensors might be based on the electromechanical technologies such as the ball-in-tube sensor described in U.S. Pat. No. 4,900,880 or in some cases even electronic sensors could be used as crush zone mounted sensors for this purpose.

Other technical papers which provide pertinent background information to this invention include:

1. Breed, D. S., Castelli, V. "Problems in Design and Engineering of Air Bag Systems", Society of Automotive Engineers paper No. 880724, 1988.
2. Breed, D. S., Castelli, V. "Trends in Sensing Frontal Impacts", Society of Automotive Engineers paper No. 890750, 1989.
3. Castelli, V., Breed, D. S. "Trends in Sensing Side Impacts", Society of Automotive Engineers paper No. 890603, 1989.
4. Breed, D. S., Castelli, V. and Shokoohi, F. "Are Barrier Crashes Sufficient for Evaluating Air Bag Sensor Performance?", Society of Automotive Engineers paper No. 900548, 1990.
5. Breed, D. S., Sanders, W. T. and Castelli, V. "A Critique of Single Point Crash Sensing", Society of Automotive Engineers paper No. 920124, 1992.
6. Breed, D. S., Sanders, W. T. and Castelli, V. "Performance of a Crush Sensor for Use with Automobile airbag Systems", Society of Automotive Engineers paper No. 920122, 1992.
7. Shokoohi, F., Sanders, W. T., Castelli, V., and Breed, D. S. "Cross Axis Specifications For Crash Sensors", Automotive Technologies International Report, ATI 12004, 1991. Society of Automotive Engineers paper No. 930651, 1993.
8. Breed, D. S., Sanders, W. T. and Castelli, V. "A complete Frontal Crash Sensor System—I", Society of Automotive Engineers paper No. 930650, 1993.
9. Breed, D. S. and Sanders, W. T. "Using Vehicle Deformation to Sense Crashes", Presented at the International Body and Engineering Conference, Detroit Mich., 1993.
10. Breed, D. S., Sanders, W. T. and Castelli, V., "A complete Frontal Crash Sensor System—II", Proceedings Enhanced Safety of Vehicles Conference, Munich, 1994, Published by the U.S. Department of Transportation, National Highway Traffic Safety Administration, Washington, D.C.
11. Breed, D. S., Sanders, W. T. and Castelli, V., "Sensing Side Impacts", Society of Automotive Engineers paper No. 940561, 1994.
12. Breed, D. S., "Side Impact Airbag System Technology", Presented at the International Body and Engineering Conference, Detroit Mich., 1994.
13. Breed, D. S., "A Smart Airbag System", Presented at the $16^{th}$ International Technical Conference on the Enhanced Safety of vehicles, Windsor, Canada, Paper Number 98 S5 O 13, 1998.

Other relevant prior art includes U.S. Pat. No. 3,859,482 to Matsui, which will now be discussed in some detail. Matsui shows various devices which respond to the force (pressure using Matsui's terminology) which accompanies a vehicle frontal crash when material in the extreme front of the vehicle, or the impacting object itself, impacts the force detecting device. Matsui also mentions, but does not illustrate, the use of his force detectors on the rear and the side of the vehicle. The Matsui devices discriminate crashes based on the magnitude of this force on the detecting device, which as stated in the patent, are in the order of tons (metric). Many devices are described in Matsui however the following generalizations apply:

1. The Matsui sensors. are mechanical pressure (force) detecting devices. This is stated in the title of the patent and throughout, there is only discussion of pressure being applied directly to the sensor. Except in those cases where a tape switch or a rope is used as the forwardmost point on the vehicle, there is always associated with the device a "Presser Member" whose function is to apply force directly to the sensor. Most importantly, this is a device which determines the severity of a crash based on force where the force is in the order of metric tons.

As discussed in greater detail below, the devices disclosed in the instant invention are displacement and velocity sensors not force sensors. They do not require tons of force to actuated and a "Presser Member" is not required or in general used.

2. The Matsui sensors are used in combination with a high level deceleration detector. In all cases, the Matsui sensor is used in conjunction with an acceleration sensor. This sensor is a low level discriminating sensor which is different from the safing sensor used on most current airbag systems. The difference between these types of sensors is that the Matsui sensor is not used alone to discriminate the crash, that is to determine whether the crash requires deployment of an airbag. An additional discriminating sensor is required. By contrast, in conventional airbag systems, a safing or arming sensor is used to guard against electrical shorts in the sensor perhaps caused by vehicle maintenance. The safing sensor will trigger on pothole impacts for example. It is not intended to provide information as to the severity of the crash. This is not the case in the Matsui acceleration sensor which is used in series with a force sensor. This is clear by the illustrated embodiment in FIG. 29 which shows that the deceleration sensor requires a value of acceleration to trigger which is shown to be a substantial percent of the peak deceleration of curve A which is on the order of about 40 G's (see for example FIG. 1 of reference 1 above). In contrast, typical safing or arming sensors trigger on a deceleration of less than about 2 G's.

Again, as will be discussed in detail below, in contrast, the sensors of the present invention are discriminating sensors and do not require a high level deceleration sensor or any deceleration sensor for that matter, but can be used with such a sensor in some implementations. As the sensors of this invention are used as discriminating sensors, a low level safing or arming sensor can optionally be used to provide electrical isolation of the inflator initiator so that momentary electrical shorts do not cause deployment of the airbag.

3. In many illustrations of the Matsui devices a frangible system is used. In one case, for example, a wire inside a glass tube, or a glass rod or tube which has been plated with silver, is used. In some of these cases, a sensor design is illustrated which is substantially longer than it is thick or wide. In this manner, the sensor can extend across a significant portion of the vehicle in much the same way that the rod-in-tube or coax sensors of the instant invention are implemented. These frangible sensors trigger by being broken, usually by means of a "Presser Member" and to thereby break an electric circuit.

As discussed below, in contrast, the sensors of this invention are not frangible and function by crushing or bending not by breaking and the output is in general not a switch closure but an impedance versus time function that permits the crush velocity to be determined.

4. Due to the requirement that tons of force are needed to trigger the Matsui sensor, rigid mounting thereof is a requirement. This is particularly important at the place on the sensor where triggering is intended to occur.

As set forth below, in contrast, the sensors of this invention sense a crash by crushing or be bending and therefore need not in general be rigidly mounted to the extent that they support more than a few hundred pounds.

5. Tape switch implantation uses pressure actuated tape switches not those designed to by actuated by bending. Matsui explicitly states that the tape switch implementations disclosed are actuated by pressure (column 26, lines 20–23).

As discussed below, the sensors of the instant invention measure the crush velocity by crushing or bending. Also the sensors of this invention are not in general switches but are velocity change measuring devices.

6. The elongated sensors illustrated by Matsui are either frangible, pressure sensing tape switches, or sensors made by stretching a line or rope. All of these designs differ significantly from the rod-in-tube or coaxial cable sensors of the instant invention. The remaining sensors disclosed are all point sensors which trigger when tons of force are applied to the sensor surface. In none of these cases is a sensor designed to function through a measurement of impedance change or to detect a change in velocity suggested.

7. In spite of the large potpourri of sensor designs disclosed, all of which have serious technical deficiencies, nowhere does Matsui suggest a rod-in-tube or coaxial cable geometry of the sensor. The rod-in-tube and coaxial cable geometries permits the sensor to be arbitrarily formed so that it covers all portions of the vehicle that are likely to be involved in a crash. In contrast, the elongated sensors of Matsui are typically shown mounted onto the bumper (erroneously designated as the fender) or immediately behind the bumper. An observation of frontal impacts shows that in approximately 30% of frontal airbag required accidents the bumper is not impacted. Thus, for these cases the Matsui sensor would not trigger.

For the purposes herein, the crush zone is defined as that part of the vehicle which crushes or deforms during a particular crash. This is a different definition from that used elsewhere and in particular in the above referenced technical papers. Also for the purposes herein, the terminology Crush Sensing Zone, or CSZ, will be used to designate that portion of the vehicle which is deformed or crushed during a crash at the sensor required trigger time. The sensor required trigger time is considered the latest time that a crash sensor can trigger for there to be sufficient time to deploy the airbag. This is determined by the airbag system designers and is a given parameter to the sensor designer for a particular crash. Naturally, there will be a different required sensor triggering time for each crash, however, it has been found, as reported in the above references, that the CSZ is remarkably constant for all crashes of the same type.

For example, the CSZ is nearly the same for all frontal barrier crashes regardless of the velocity of the crash. The same is true for 30 degree angle barrier crashes although the CSZ is different here than for frontal barrier crashes. Remarkably, and unexpectedly, it has also been found that when all frontal crashes at all different velocities are taken into account, the CSZ rearmost boundary becomes an approximate three dimensional surface lying mostly within the engine compartment of the vehicle, typically about ten to twelve inches behind the bumper at the center, and extending backward when crashes outside of the rails are considered. Finally, if a sensor is placed on this CSZ surface so that it is higher than the bumper level on the 'sides of the vehicle and lower in the vehicle center, as shown in FIG. 1 herein, it will do a remarkable job at discriminating between airbag required and non-deployment crashes and still trigger by the sensor required triggering time and before other sensors of comparable sensitivity. Naturally, this system is not perfect, however, it has been shown to do a better job than any other sensor system now in use.

It was this discovery which provided a basis for the subject matter described in U.S. Pat. No. 4,995,639 and then to the rod-in-tube sensor described in U.S. Pat. No. 5,441, 301. During the process of implementing the rod-in-tube sensor, it was found that the same theory applies to rear impacts and that rod-in-tube sensors also have applicability to side impact sensing, although the theory is different.

In U.S. Pat. No. 5,694,320 (Breed), incorporated by reference herein, the theory of sensing rear impacts is presented and it is concluded that an anticipatory sensing system is preferred. This is because many people suffer whiplash injuries at rather low velocity impacts and if an inflatable restraint is used, the repair cost may be significant. To protect most people from whiplash injuries in rear impacts, therefore, a resetable system is preferred. The argument on the other side is that if the headrest is properly positioned, it will take care of all of the low velocity impacts and, therefore, an airbag can be used and reserved for the high velocity impacts where a crush sensing crash sensor would be used. The rod-in-tube sensor disclosed herein is, therefore, ideal for use with a deployable headrest mounted airbag for the same reasons that it is a good sensor for sensing frontal impacts. Since the rear of a vehicle typically has about one third of the stiffness of the vehicle front, electronic sensors will have even a tougher time discriminating between trigger and non-trigger cases for rear impacts. As disclosed in references 5 and 9 above, it is the soft crashes which are the most difficult for electronic sensors to sense in time.

Crush sensing crash sensors are not ideal for sensing side impacts alone, although the Volvo side impact system uses such a sensing system. This is because the sensing time is so short that there is virtually no crush (about two inches) at the time that the airbag must be deployed. Since there is very little signal out of the crush zone where electronic sensors are mounted, electronic sensors alone are not able to discriminate airbag required crashes from other crashes not requiring airbag deployment. The combination of the two sensors, on the other hand, can be used to provide a reliable determination. The crush sensor determines that there has been two inches of crush and the electronic sensor determines that the acceleration signal at that time is consistent with there being an airbag required crash. Thus, although they cannot be reliably used alone as a discriminating sensor for side impacts, the combined system does function properly.

An alternate use of the crush sensor such as the rod-in-tube sensor in side impacts is as a safing sensor. In this role, it merely determines that a crash is in progress and the main discriminating function is handled by the velocity sensing sensors such as disclosed in U.S. Pat. No. 5,231,253 (assigned to the current assignee).

The rod-in-tube or coaxial cable crush velocity sensing crash sensors solve this side impact problem and thus applications include frontal, side and rear impacts, where in each case they enjoy significant advantages over all other crash sensing technologies. Examples of the preferred implementations are described in the paragraphs below.

With respect to other prior art related to the invention, Peachey (U.S. Pat. No. 4,060,705) describes a pressure actuated continuous switch which designed to actuate about its entire circumference, i.e., in all directions. The switch of the embodiment in FIG. 1 of Peachey includes a central, inner conductor 1, an insulating thread 2 helically wound around the conductor 1 and an outer conductor 3, all housed within a sheath of insulating material 4. The switch in the embodiment of FIG. 2 includes a central, inner conductor 1, an insulating thread 2 helically wound around the conductor 1, a sheath of graphite-loaded plastic 5 surrounding the thread 2, an outer conductor 3 surrounding the sheath 5 and a sheath of insulating material 4 surrounding the outer conductor 3. The switch in these embodiments is actuated when pressure is applied to the switch so that the outer conductor (FIG. 1) or sheath 5 (FIG. 2) is deflected to cause it to make contact with the inner conductor 1 and thereby establish electrical contact between the inner and outer conductors 1, 3, in the embodiment of FIG. 2 through the sheath 5. In view of the helical winding of the insulating thread 2 around the inner conductor 1, these switches can be actuated by bending at almost all locations (except for an impact into a location where the insulating material 2 is interposed between the conductors 1, 3).

U.S. Pat. No. 2,437,969 to Paul describes a deformable switch 10 in the form of a tube that is actuatable at all circumferential points along its length. The tube includes a central coil of electrically conducting wire 12, a braided electrically conducting, metal tube 11 and insulating separators 13 spaced at discrete locations along the length of the switch 10 to support the tube 11 around the wire 12. The switch is actuatable at all circumferential locations along the length of the tube, except for the locations at which the insulating separators 13 are located. In use, when pressure is applied to the tube 11, it deforms at the location at which pressure is applied thereby coming into contact with the wire 11 and causing a circuit to close.

U.S. Pat. No. 5,322,323 to Ohno et al. describes to a collision sensing system for an airbag including collision sensors and acceleration sensors wherein deployment of the airbag is based on a signal from the collision sensors and an analysis of the output from the acceleration sensors.

U.S. Pat. No. 5,797,623 to Hubbard describes an allegedly unique side impact sensor based on a piezoelectric film. The sensor essentially measures the energy of impact providing the entire force applied to the film, which would not in general be the case. The velocity of the impacting vehicle can be determined again if the sensor absorbs the entire force and if the mass of the impacting object is known. Since neither of these can be assumed, the device will not provide a measurement of the impacting velocity and therefore at best can act as an impact-sensing switch with some discriminating capability.

The prior art crush zone mounted sensors therefore are either force sensing switches (Matsui) or piezoelectric film sensors (Hubbard) mounted in the forwardmost part of the crush zone, are velocity change sensors (ball-in-tube) mounted at the rear most edge of the CSZ or crush sensing switches also mounted at the rear most edge of the CSZ. Sensors mounted at the rear most edge of the CSZ by nature will trigger at the last possible moment when the airbag must deploy based on the seating position of the average male occupant. It is known that currently up to about 70% of vehicle occupants sit closer to the airbag than the average male and therefore such sensors trigger airbag deployment late for such occupants placing them at risk of being injured by the airbag. Heretofore, there are no velocity change sensors that are mounted in the forward part of the crush zone where the velocity change of the crash can be determined early in the crash and the airbag deployed early. There is thus a need for such a crash sensor.

OBJECTS AND SUMMARY OF THE INVENTION

Principle objects and advantages of this invention are:
1) To provide a single sensor which will sense all airbag desired crashes involving the either the front, rear or a side of the vehicle.
2) To provide a sensor which is much longer than it is wide or thick thus permitting it to sense crashes over a large area while occupying a relatively small space.
3) To provide a sensor that can be easily shaped so to be properly placed in front of the CSZ boundary across the entire front, side or rear of the vehicle.
4) To provide a crush sensor where the rate of deformation required to trigger the sensor can be measured along the length of the sensor.
5) To provide a sensor to be used in conjunction with an electronic passenger compartment mounted sensor which will trigger on all of the airbag desired crashes which are missed by the electronic passenger compartment mounted sensor alone for either frontal, side or rear impacts.
6) To provide a simple and convenient sensor system consisting of a single discriminating sensor mounted in front of the CSZ boundary and a single arming sensor mounted in the passenger compartment for frontal, side and/or rear impacts.

7) To provide a crush velocity change crash sensor which functions when a portion of the vehicle where the sensor is mounted is displaced, deformed or otherwise bends or buckles.

8) To provide a hermetically sealed crush velocity sensing crash sensor.

9) To provide a small, inexpensive, yet highly reliable crush velocity change sensor.

10) To provide an arrangement for a vehicle including a crush zone-mounted discriminating sensor (which provides information about the reaction of the crush zone to a crash, such as the crush of the crush zone, the velocity change of the crush zone resulting from the crash and the acceleration of the crush zone resulting from the crash) in series with a passenger compartment-mounted discriminating sensor to permit a better discrimination between air bag desired and not desired crashes such as animal impacts.

11) To provide an arrangement for a vehicle including a crush zone-mounted discriminating sensor as input to an electronic passenger-compartment discriminating sensor to permit a change in the sensor algorithm, or triggering parameters, based of the output of the crush zone discriminating sensor to improve the performance of the electronic sensor.

A preferred embodiment of the sensor of this invention uses the velocity of the crushing of the vehicle as a measure of the severity of the crash as is the case with the ball-in-tube sensor of U.S. Pat. No. 4,900,880, for example. However, a key teaching of this invention is also the combination of forward or satellite sensors in the crush zone and a non-crush zone sensor and how that combination improves the overall performance of the sensor system.

In one preferred embodiment of the invention, a coaxial cable stretches from the driver side door near the B-pillar through the A-pillar, across the front of the vehicle and into the passenger side door. A signal having a frequency on the order of about 10 megahertz is imposed on the cable, which frequency is selected so that approximately the cable is approximately one wavelength long (thus the frequency could vary depending on the length of the cable). The cable is terminated at the far end with a known resistance. Under normal operation, the wave travels. down the cable and reflects off of the end and returns in phase with the transmitted pulse. If, however, the cable is compressed along its length a reflected wave will be returned that is out of phase with the transmitted wave. By comparing the phase of the reflected wave with the transmitted wave, the location of the compression can be determined and by comparing the magnitude of the reflection, the amount of compression can be determined. By measuring the amount of compression over time, the velocity of compression can be found. Thus, the location of the impact and the crush velocity (which can be considered a function of the velocity of compression) can both be determined by this sensor for both side and frontal impacts. A similar sensor could be designed for use in sensing side and rear impacts.

More generally, a crash sensor arrangement for determining whether the crash involving the vehicle requires deployment of the occupant restraint device comprises an elongate sensor arranged in the crush zone to provide a variable impedance as a function of a change in velocity of the crush zone and a processor for measuring the impedance of the sensor or a part thereof at a plurality of times to determine changes in the impedance of the sensor or part thereof. The processor provides a crash signal for consideration in the deployment of the occupant restraint device based on the determined changes in impedance of the sensor or part thereof The sensor can have a U-shaped portion extending along both sides of the vehicle and across a front of the vehicle, and thus substantially completely between opposed longitudinal edges of a door of the vehicle.

In the embodiment wherein the sensor comprises a coaxial cable, an electromagnetic wave generator generates electromagnetic waves and feeds the waves into the cable and the processor is preferably embodied in an electronic control module coupled to the electromagnetic wave generator. The electromagnetic wave generator preferably feeds electromagnetic waves into the cable having a wavelength on the same order as a length of the cable. In the alternative, the sensor can comprise parallel strips of conductive material spaced apart from one another in the absence of deformation of the crush zone and arranged to contact one another during deformation of the crush zone. The contact strips are positioned so as to be compressed during deformation of the crush zone whereby such compression causes changes in impedance of the sensor.

Another crash sensor arrangement for determining whether the crash involving the vehicle requires deployment of the occupant restraint device comprises a first discriminating crash sensor mounted outside of the crush zone of the vehicle and structured and arranged to trigger by means other than crush of the crush zone of the vehicle, and a second discriminating crash sensor coupled to the first sensor and mounted in the crush zone of the vehicle. The second sensor provides a signal representative of a velocity change of the crush zone during the crash to the first sensor. The first sensor receives the signal representative of the velocity change of the crush zone of the vehicle to the crash from the second sensor, considers whether triggering of the first sensor should be modified based on the velocity change of the crush zone of the vehicle to the crash provided by the second sensor and if so, modifies triggering of the first sensor. The first sensor may consider whether to modify its sensitivity based on the velocity change of the crush zone of the vehicle to the crash. The first sensor can be designed to trigger based on a reaction of the entire vehicle or a part of the vehicle other than the crush zone of the vehicle to the crash and/or may be a discriminating electronic sensor arranged to trigger based on at least one of acceleration of the vehicle and a change in velocity of the vehicle. The second sensor may be the coaxial cable sensor described above in which case, the arrangement includes the additional components, e.g., the electromagnetic wave generator.

Preferred embodiments of the invention are described herein and unless specifically noted, it is the applicant's intention that the words and phrases in the specification and claims be given the ordinary and accustomed meaning to those of ordinary skill in the applicable art(s). If applicant intends any other meaning, he will specifically state he is applying a special meaning to a word or phrase.

Likewise, applicant's use of the word "function" here is not intended to indicate that the applicant seek to invoke the special provisions of 35 U.S.C. §112, sixth paragraph, to define his invention. To the contrary, if applicant wishes to invoke the provisions of 35 U.S.C. §112, sixth paragraph, to define his invention, he will specifically set forth in the claims the phrases "means for" or "step for" and a function, without also reciting in that phrase any structure, material or act in support of the function. Moreover, even if applicant invokes the provisions of 35 U.S.C. §112, sixth paragraph, to define his invention, it is the applicant's intention that his inventions not be limited to the specific structure, material or acts that are described in the preferred embodiments herein. Rather, if applicant claims their inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

Other objects and advantages of the present invention will become apparent from the following description of the preferred embodiments taken in conjunction with the accompanying drawings.

BRIEF DESCRIPTION OF THE DRAWINGS

The following drawings are illustrative of embodiments of the invention and are not meant to limit the scope of the invention as encompassed by the claims.

FIG. 18 is a circuit schematic showing a forward mounted electronic sensor used as an input to a crash sensor mounted outside of the crush zone.

DETAILED DESCRIPTION OF THE PREFERRED EMBODIMENTS

Figure 1:
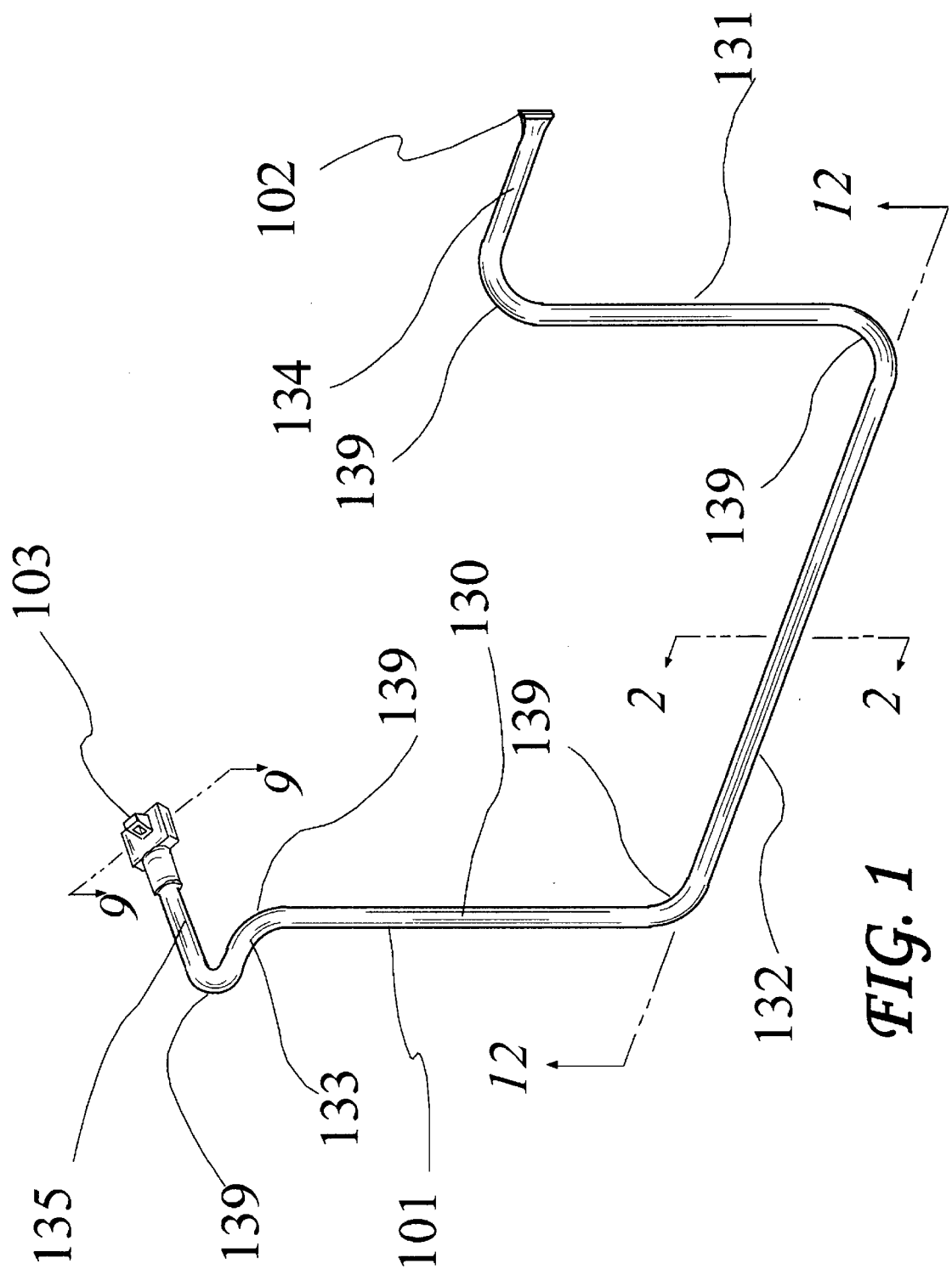
FIG. 1 is a perspective view of a preferred embodiment of the sensor of this invention for use in frontal impacts shown removed from the vehicle.
Figure 2:
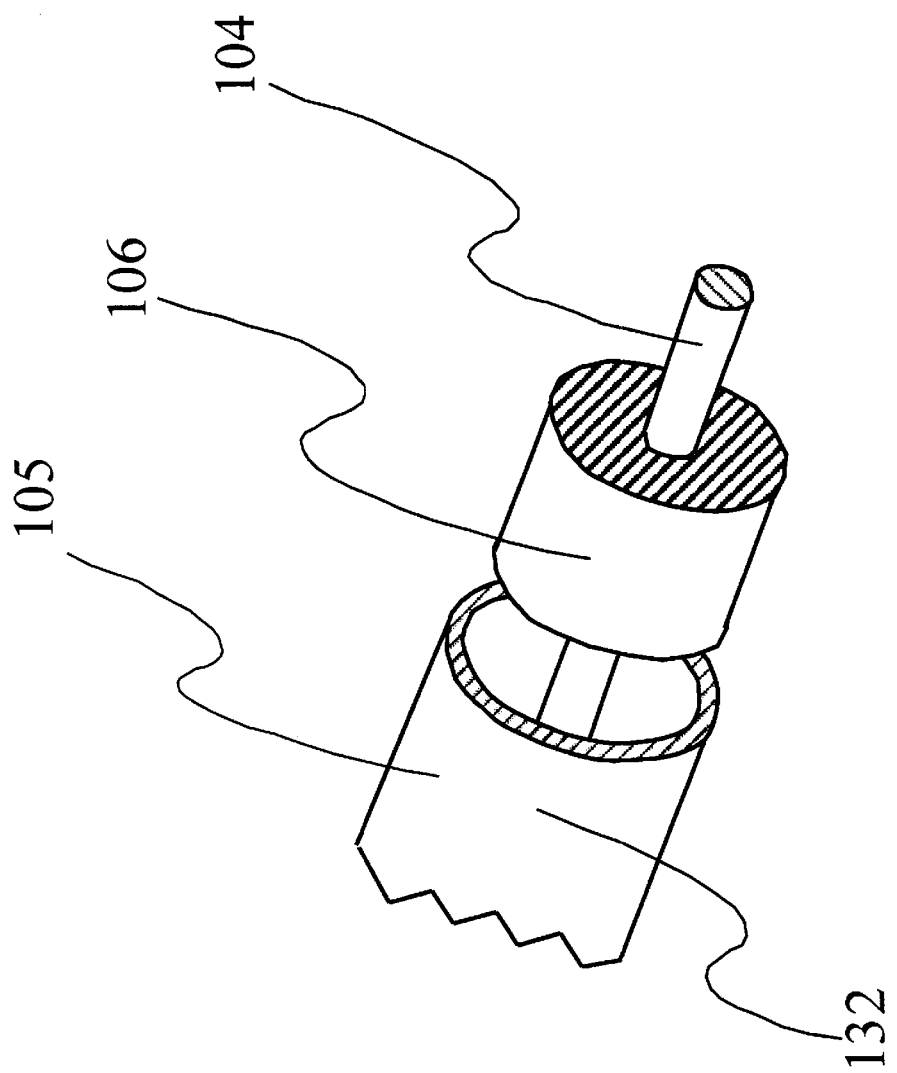
FIG. 2 is a perspective view taken along lines 2—2 of the sensor shown in FIG. 1 with the interior parts pulled apart to illustrate the interior structure.
Figure 3:
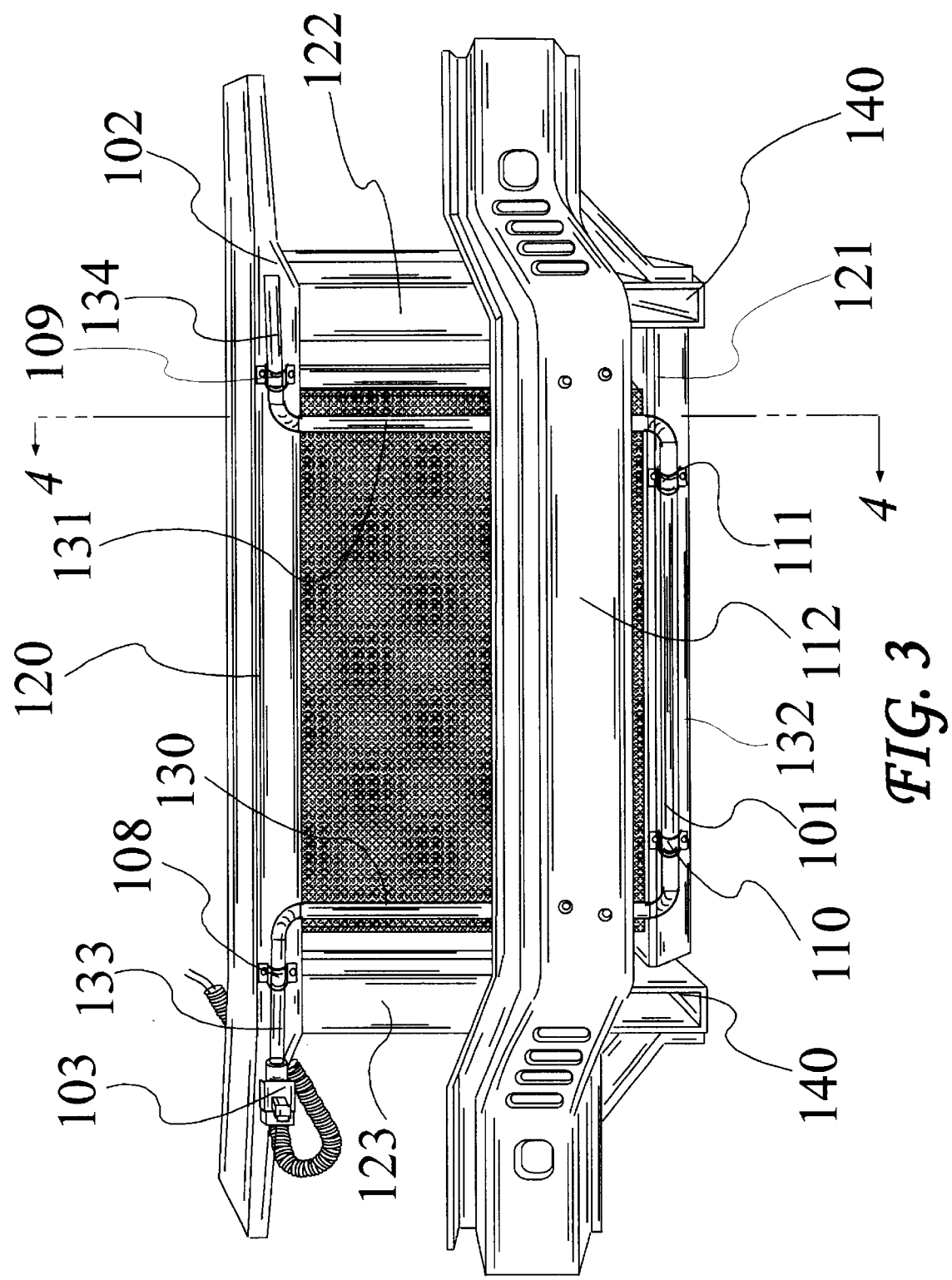
FIG. 3 is a frontal view of another preferred embodiment of the sensor of shown mounted on a vehicle to sense frontal impacts with portions of the vehicle removed to permit viewing of the sensor.

Referring to the accompanying drawings wherein like reference numerals refer to the same or similar elements, the crush velocity sensor constructed in accordance with the teachings of this invention for use in sensing frontal impacts is shown generally at 101 in FIG. 1. The sensor 101 comprises a unitary, tubular member having two vertical portions 130 and 131, a lower horizontal portion 132, two upper horizontal portions 133 and 134 and a rearward projecting portion 135. The sensor 101 is closed at an end 102 of horizontal portion 134, e.g., by welding, as described below and a header/connector 103 is attached to the sensor 101 at the end of portion 135. The sensor 101 is mounted to the front of the vehicle as shown in FIG. 3 and is constructed of a tube 105 and a centrally located rod 104 as shown in FIG. 2, which is substantially coextensive with the tube 105 but normally not in contact therewith. The sensor 101 functions when it is bent at any position along the tube 105 with the exception of bent sections or bends 139 which join the vertical portions 130,131 to the upper horizontal portions 133,134, respectively, described above and where plastic spacers 106 prevent the rod 104 from contacting the tube 105. When the sensor 101 is bent during a crash, the rod 104, which is made of an electrically conductive material and thus electrically conducting, approaches the tube 105, which is also made of an electrically conductive material and thus electrically conducting. Appropriate circuitry induces an electromagnetic wave in the tube relative to the rod with a wavelength what is approximately equivalent to the length of the tube. The wave reflects off of the end of the tube which is connected to the rod though an impedance device, typically a resistor. If the impedance between the tube and rod changes along its length such as would happen if the tube were bent or crushed, a reflection from the lower impedance point also occurs and be comparing the phase with the wave reflected off of the end of the tube, the location of the lower impedance point can be determined. By comparing the magnitudes of the intermediate reflected waves over time, the rate of change in the impedance can be determined and an estimate of the crush velocity obtained. Alternately, the time that the initial intermediate reflection first occurred can be noted and the time when the tube contacts the rod can also be noted and the difference divided into the deflection required to cause rod to tube contact at that particular location providing a measure of the crush velocity. If this crush velocity is above the threshold for airbag deployment, the airbag can be deployed. If this device is mounted far forward in the crush zone, then it will provide an early measurement of the crash velocity providing an earlier deployment decision than prior art velocity change sensors that are located on the CSZ.

The shape of the sensor 101 shown in FIG. 1 is not limiting and is shown for illustration purposes only. For the same vehicle shown in FIG. 3, other shapes of sensors may be used and for a vehicle with a difference front end, the sensor may take any form sufficient to enable it to perform the desired functions, as described herein.

The rod 104 is maintained in a central location within the tube 105 as illustrated in FIG. 2 by means of the substantially cylindrical spacers 106 which are placed at each of the bends 139 in the tube 105 and, in one preferred embodiment, in the center of the lower horizontal portion 132 as shown in FIG. 2. The spacers 106 are made from an electrically non-conductive material, such as plastic or other suitable flexible material such as rubber, thus preventing the completion of the electric circuit through the spacers 106. Although in the preferred embodiment shown in FIG. 1, spacers 106 are only placed in the bends 139 and at the center of the horizontal portion 132, in other embodiments, spacers 106 can be placed arbitrarily along the length of the sensor 101 in order to adjust the sensitivity of the sensor 101 to particular crash events. The effect of the spacers 106 is dramatic. The deflection required to cause electrical contact in the sensor at the center of the lower horizontal portion 132 is approximately 0.1 inches if the spacer 106 is not present, and greater than 1 inch if the spacer 106 is present.

Also, the tubular form of the sensor 101 is only a preferred embodiment, it may have other cross-sectional forms, e.g., rectangular, oval or polygonal, depending on the particular need while the spacers 106 similarly are constructed to substantially conform to the interior shape of the sensor 101. The variable positioning of the spacers 106 provides the advantage of the selective sensitivity of the sensor 101 to crashes in specific areas along the length of the sensor 101. As shown, the spacers 106 extend circumferentially about the rod 104 only at discrete locations in the tube 105 so that entire circumferential portions of the rod 104 are spaced from the tube 105. When the coaxial cable is used, spacers are not required as the entire space between he center and outer conductors is filled with dielectric material Although spacers 106 are shown to prevent electrical engagement of the rod 104 and the tube 105, other spacing means may also be provided to achieve the same function.

The crush velocity sensor of this invention is shown mounted on a vehicle in FIG. 3 where a substantial portion of the vehicle has been removed to better illustrate how the sensor 101 is mounted. In the configuration in FIG. 3, the rearward portion 135 of the sensor 101 has been eliminated and the sensor 101 extends only toward the outside of the vehicle. The vehicle structure shown consists of an upper radiator support 120, two vertical radiator supports 122 and 123 and a lower radiator support 132. The two vertical radiator supports 122, 123 and the lower radiator support 132 are attached to rails 140 which are the structures of the vehicle which support the front end. A bumper structure 112 (of a particular vehicle) but not the bumper plastic cover is also illustrated in FIG. 3. The crush velocity sensor 101 in accordance with the invention is attached to the upper radiator support 120 by attachment means, e.g., conventional hardware 108 and 109, and to the lower radiator support 132 by attachment means, e.g., conventional hardware 110 and 111 Hardware elements 108,109,110,111 are clamps having two holes for enabling a screw or nail to connect the clamps to the radiator supports. Obviously, any attachment means are suitable for these purposes. Note that this arrangement is the furthermost to the rear of the vehicle that such a frontal impact sensor can be located. Generally it will be located more forward in the crush zone.

Figure 4A:
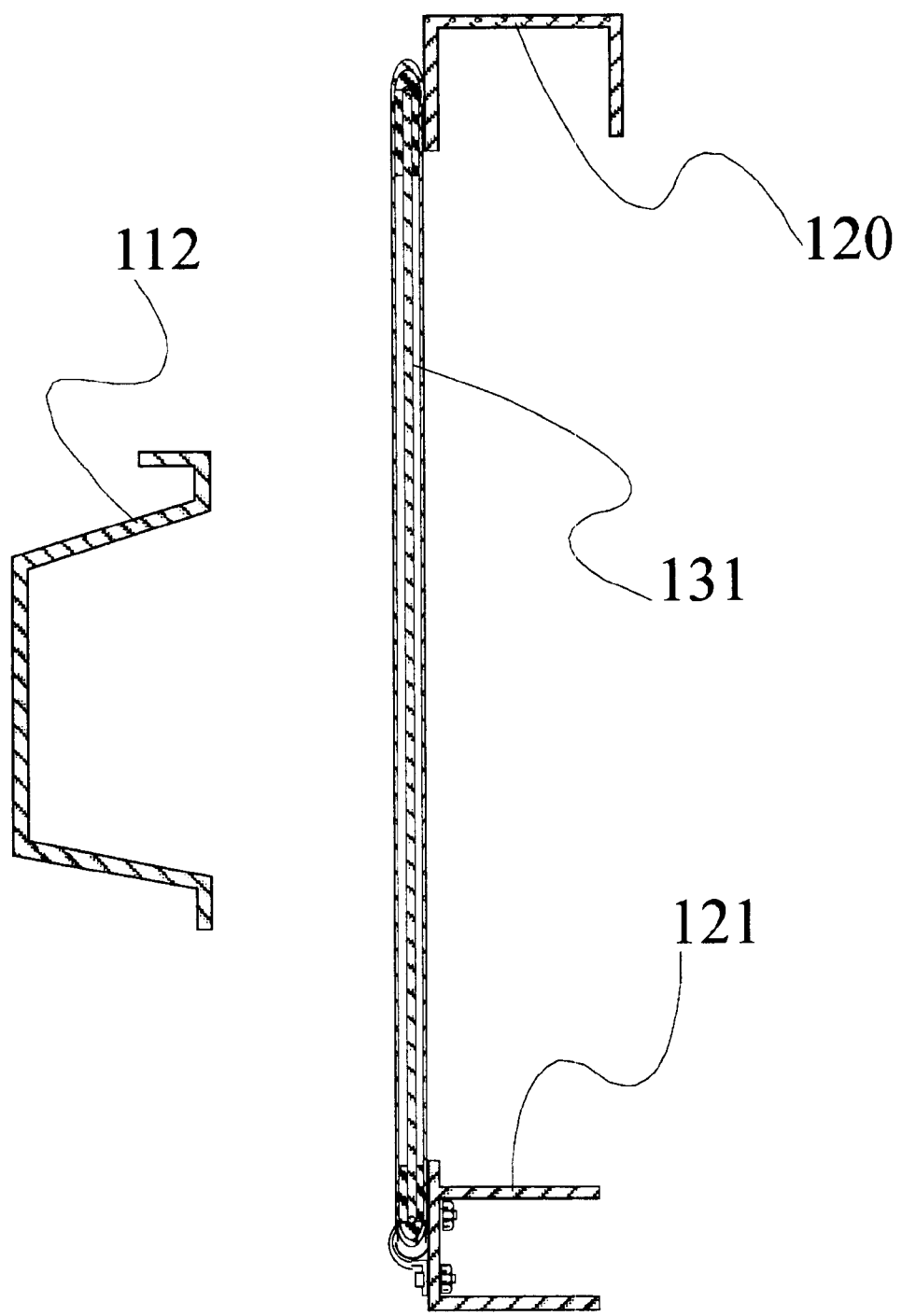
FIG. 4A is a view of a vertical segment of the sensor shown in FIG. 3 taken along line 4—4 in a condition before being impacted by the vehicle bumper during a crash.
Figure 4B:
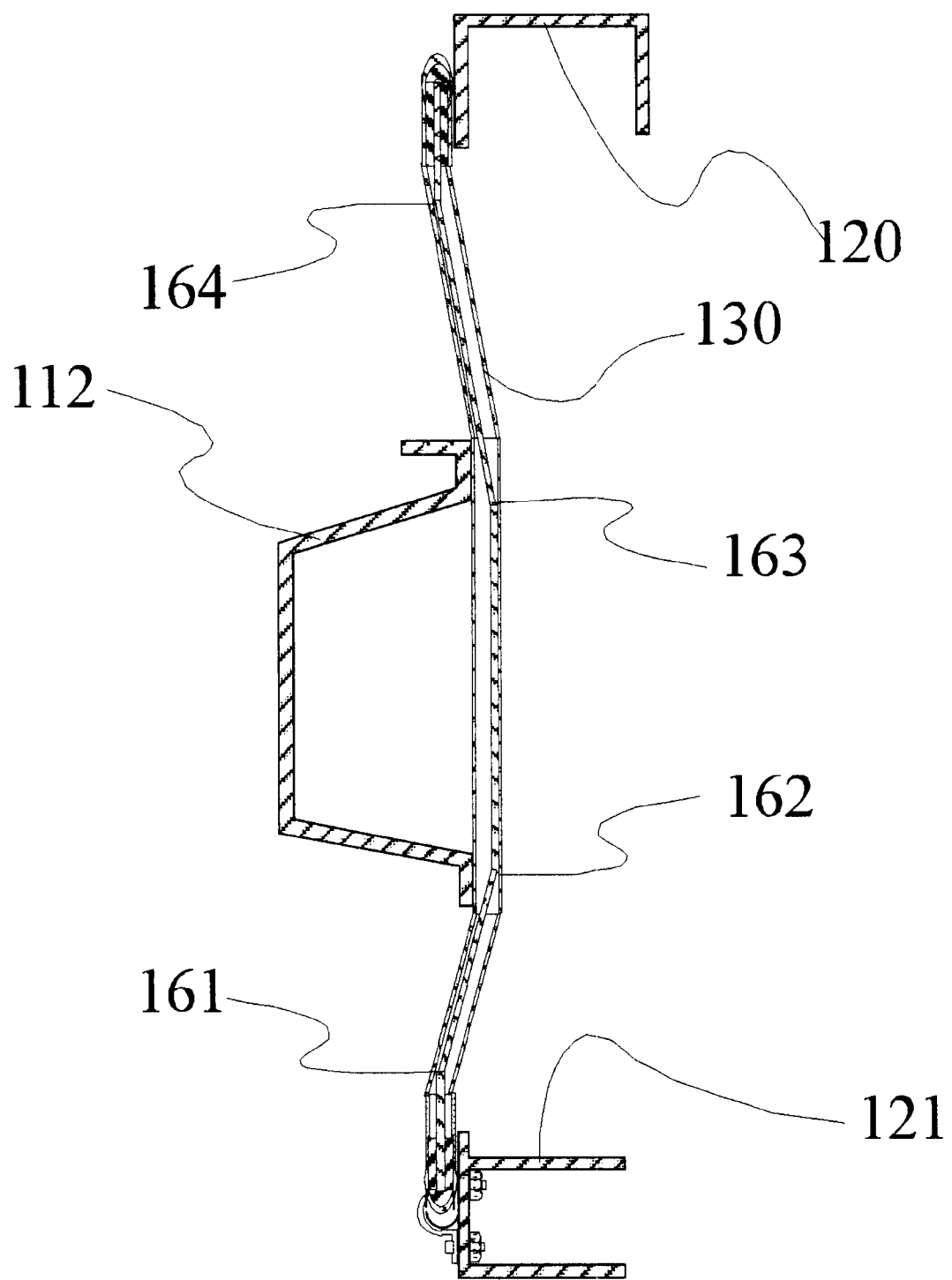
FIG. 4B is the same view of the sensor shown in FIG. 4A after being impacted by the vehicle bumper during a crash.

During a frontal impact with either a barrier or another vehicle, for example, bumper structure 112 is displaced toward the rear of the vehicle relative to the radiator supports of the vehicle to a position where it impacts the vertical portions 130 and 131, of the crush velocity sensor 101, which are mounted so as to be spaced away by attachments 108–111 and thereby not in contact with the vehicle. This sequence is illustrated in FIGS. 4A and 4B which are views taken along lines 4—4 of FIG. 3. Upon impact with sensor vertical portion 131, bumper structure 112 causes the rod and tube assembly of sensor 101, and at least vertical portions 130, 131, to bend which in turn causes the rod 104 to move relatively closer to the inside of the tube 105, at locations 161, 162, 163, and 164, which can be measured by the change in impedance as is known to those skilled in the are. By measuring this change in impedance over time, an estimate of the crash velocity can be made. Alternately by timing the interval from the first change in impedance until contact between the rod and tube, the velocity can be determined and if above a threshold the airbag can be deployed. Although in this case four contacts are made between the rod and the tube, they will not occur simultaneously and thus the crush velocity can be determined based on the first occurrence. In this manner, any crash which causes the bumper structure 112 to be displaced toward the rear of the vehicle will permit the crash velocity to be determined.

A key advantage of the sensor in accordance with this invention is that it operates on bending. During a crash, the impact to a particular point in or on the vehicle cannot be guaranteed but the fact that a line across the front, side or rear of the vehicle will not remain straight can almost assuredly be guaranteed. Therefore a sensor which is long and narrow and responds to bending will be highly reliable in permitting the crash velocity to be determined even the most unusual crashes. The inventive sensor can be designed to cover a significant distance across the vehicle as well as along both sides back almost to the B-pillar which increases the probability that it will be struck by crushed material and bent as the crush zone propagates in the vehicle during a crash. At the same time, the sensor 101 is small so that it can be located in a position to sense the fact that one part of the vehicle has moved relative to some other part or that the structure on which the sensor 101 is mounted has deformed. In this regard, sensor 101 may be positioned at the rear of the CSZ of the vehicle but is most appropriately positioned as far forward in the vehicle as practical.

Not all crashes involve the bumper and in a survey of crashed vehicles (see SAE paper No. 930650), as many as 30% of the surveyed vehicles were involved in crashes where the bumper was not primarily involved. A typical crash of this type involves a vehicle which is braking and therefore pitching forward which lowers the front bumper and raises the rear bumper. If this first vehicle is struck in the rear by another second vehicle which is similarly pitching, the second striking vehicle will impact the first struck vehicle with the front bumper of the second striking vehicle riding underneath the rear bumper of the first struck vehicle. In this case, the bumper of the first struck vehicle will impact the grill and radiator of the second striking vehicle and displace the vertical portions 130 and 131 of the crush switch sensor in accordance with this invention. As such, the crash velocity can be determined and the airbag deployed.

When the bumper structure 112 is involved in an accident, it generally maintains its structural shape until it begins impacting the radiator and other structures behind the radiator. This is after it has impacted the sensor 101. Since the bumper structure 112 has not yet deformed when it strikes the sensor 101, the sensor 101 triggers on a crush of the vehicle equivalent to the distance between the rear of the bumper structure 112 and the sensor 101, plus the amount of sensor deflection required to trigger. If the bumper structure 112 is not primarily involved in the accident, the amount of penetration into the vehicle required to trigger the sensor 101, measured from the front of the bumper structure 112, will be greater by the amount of the thickness of the bumper structure 112. In this manner, the sensor system requires greater penetration into the vehicle in bumper underride crashes. This results in a longer time to trigger which is desired when the sensor is acting as a switch since such crashes are softer than those crashes which involve the bumper and therefore there is more time available before deployment of the airbag is required. On the other hand, for crash velocity sensors, it is desirable that the sensor be as far forward as practical since the sensor functions by measuring the velocity of the crash and not the crush. Naturally, the sensor can be designed to act in both capacities, as a velocity measuring device and as a crush measuring device, at the expense of somewhat later triggering.

In some cases, it is necessary to further desensitize the sensor to bumper underride type crashes to make the sensor less sensitive to deer impacts, for example. Every year in the United States there are approximately 300,000 impacts with deer and in most cases airbag deployment is not needed. Currently used sensor systems, however, can cause the airbag to deploy on deer impacts. When impacted at high speeds, the crash pulse in the non-crush zone can be similar to the crash pulse from a barrier crash up to the time that the decision must be made to deploy the airbag. In such cases, electronic sensors operating on the non-crush zone crash pulse will determine that the airbag deployment is required. Currently used crush zone sensors are typically mounted above the bumper and project outward from brackets attached to the upper radiator support. These sensors are impacted by a deer even at lower speeds and experience a velocity change sufficient to cause deployment of the airbag.

Figure 5:
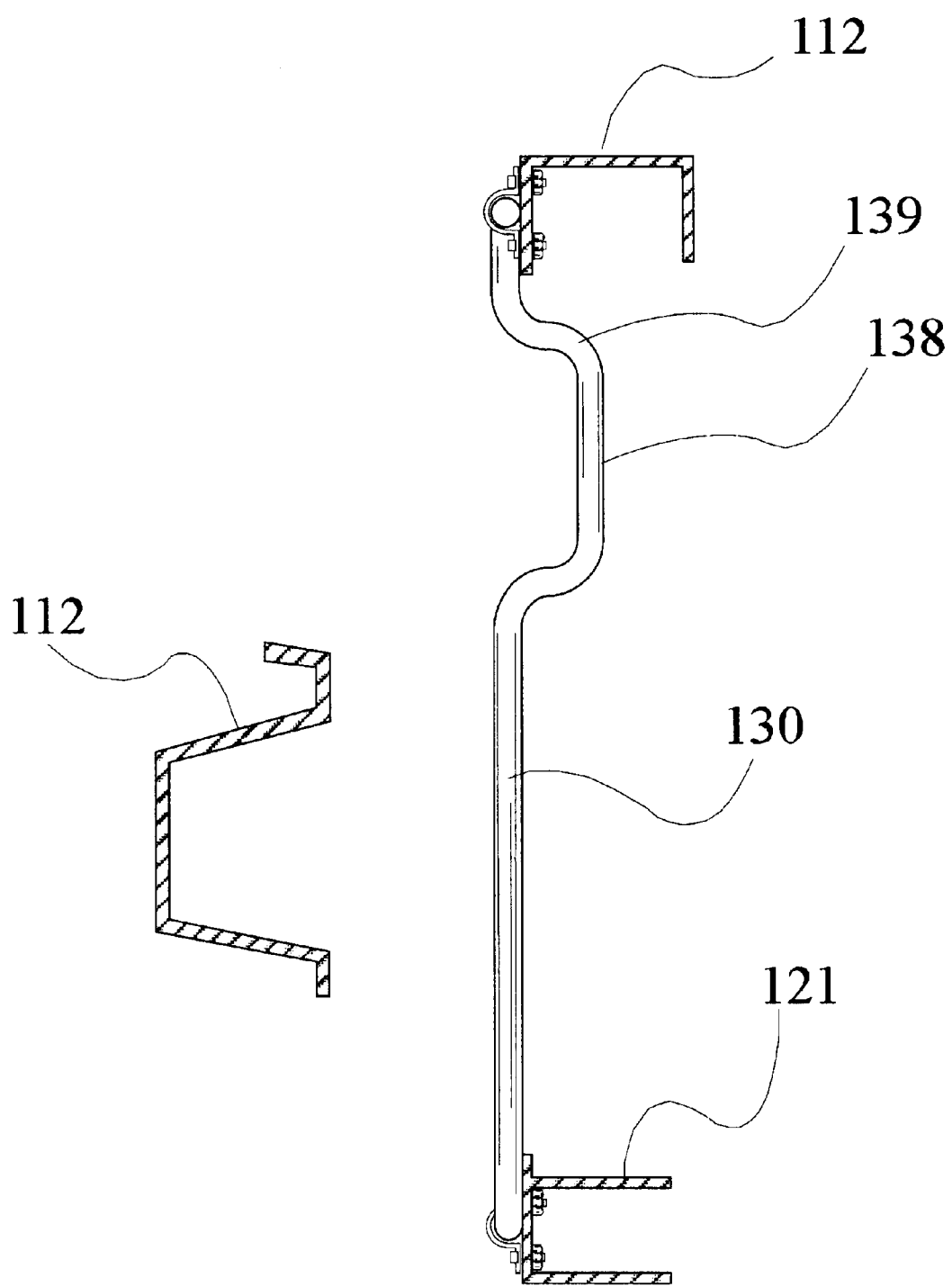
FIG. 5 is a partial view of an alternate configuration of a vertical portion of the sensor of FIG. 4A showing it displaced rearward to reduce its sensitivity to impacts above the bumper.

The crush velocity sensor in accordance with the invention, however, can be desensitized in a manner such as shown in FIG. 5 so as to render it insensitive to deer impacts (or impacts with other large animals). In this case, a section designated at 138, of at least the vertical portion 130, of the sensor 101 has been displaced rearward to render it less sensitive to deer impacts. Section 138 is substantially U-shaped. Vertical portion 130 and horizontal portion 132 can also be constructed with a rearwardly displaced portion to thereby enable adjustment in the degree of sensitivity of the sensor 101.

Figure 6:
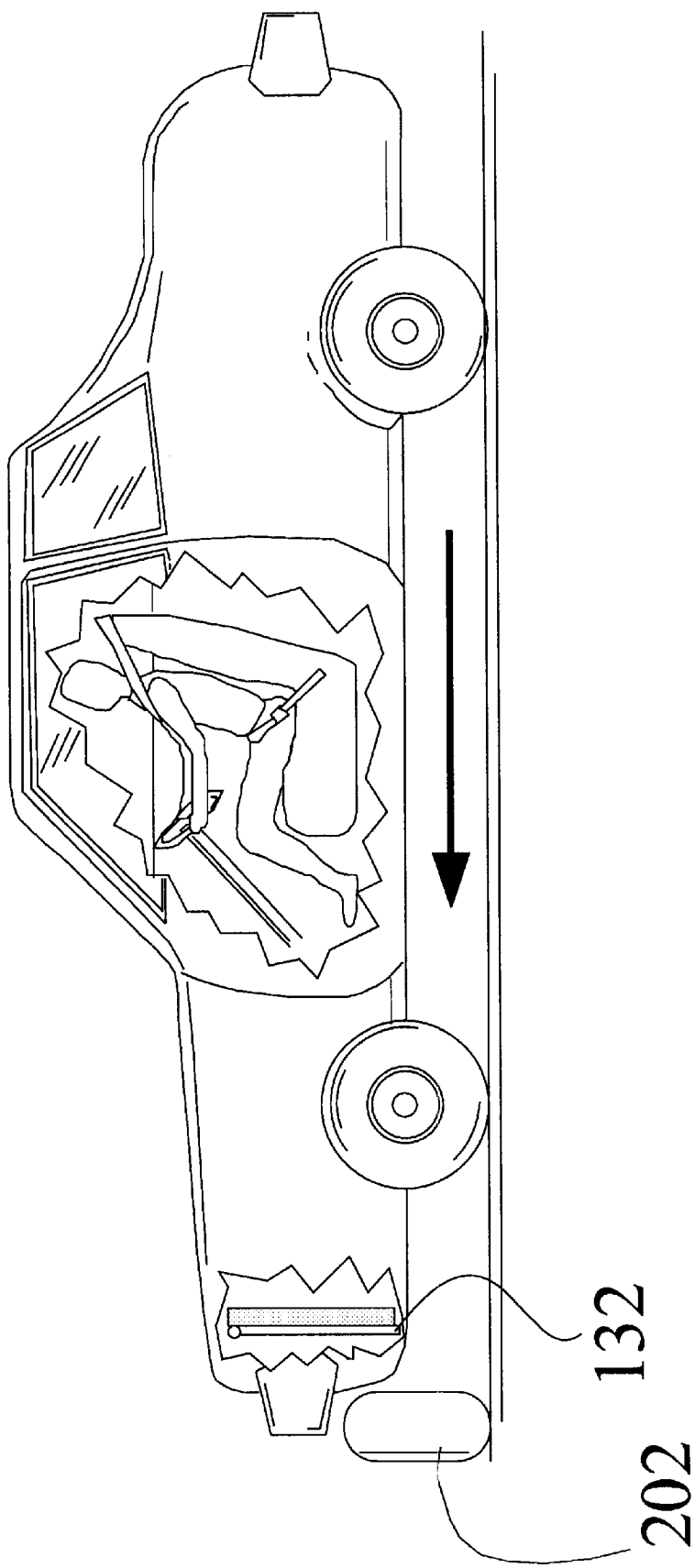
FIG. 6 is a view of a vehicle taken from the side, with certain portions removed, which is about to impact a low pole which misses the bumper, illustrating the ability of the sensor to respond to this type of crash.

Approximately 2% of frontal crashes involve impacts to the vehicle below the bumper. In a typical case, a vehicle impacts with a large stone, tree stump or short or low pole which miss the bumper. This type of accident is expected to become more common since in order to make vehicles more aerodynamic, vehicle hoods have been made lower and the radiators have also been lowered until as much as one-third of the radiator now projects below the lower edge of the bumper. An impact with a short pole or curb 202 such as shown in FIG. 6 where the pole interacts with the lower portion of the radiator, can result in an airbag required crash which will not be properly sensed by current sensor technology, e.g., ball-in-tube or accelerometer based crush zone sensors. These crush zone sensors are typically mounted above the bumper and therefore would not be in the crush zone for this kind of a crash causing them to trigger on the non-crush zone crash pulse resulting in a late deployment of the airbag. The preferred embodiment of the crush switch sensor of this invention shown in FIG. 6, on the. other hand, stretches across the front of the vehicle and will trigger thereby causing the airbag to deploy in time for these crashes.

About the most common of all real-world airbag crashes involve impacts with poles. Pole impacts are some of the most difficult crashes to sense properly with current airbag sensor technology. Poles that can require airbag deployment vary in diameter from as little as about 4 inches to greater than about 24 inches. They involve such objects as fence posts, light poles, trees and telephone poles which are the most common obstacles found along the sides of roads. An impact into a pole at any position along the front of the vehicle can result in a serious accident requiring deployment of the airbag. The stiffness of the vehicle, however, varies significantly from one part of the front to the other. For most vehicles, the center front is the softest part of the vehicle, and the rails are the stiffest. In a typical accident, the bumper will buckle around a pole resulting in a soft crash pulse until the pole penetrates sufficiently into the vehicle that it begins to engage major structural members or the engine at which time, the pulse becomes very stiff. This type of crash pulse is particularly difficult for non-crush zone sensors to sense properly.

Pole crashes are typically staged by automobile manufacturers during their airbag development programs, but they are limited in scope. They typically involve large poles that are one foot or more in diameter and are usually run at high speeds. It has been found, however, that thin poles at low speeds are much more difficult to enable proper sensing for airbag deployment than thick poles at high speeds. Non-crush zone sensors have a particularly difficult time in sensing pole crashes especially those involving thin poles at low velocities, since the crash pulse is very soft until it is too late to initiate airbag deployment. Conventional crush zone sensors, such as the ball-in-tube and accelerometer based sensors, function properly as long as the sensor is located in-line with the impact point of the pole. When this is not the case, and especially when the impact speed is low, these sensors can fail. A particular case, for example, involved a vehicle which has three ball-in-tube sensors mounted in the crush zone, one center mounted and one on each side approximately in line with the rails. This vehicle impacted a pole at approximately 15 miles per hour at a point midway between the front center and side sensors. An examination of the vehicle showed that there was no crush at either of the sensor locations. In this case, the sensor triggered the airbag late based on the non-crush zone crash pulse as described in U.S. Pat. No. 4,900,880 (Breed) referenced above. Before the airbag deployed, the occupant had already impacted with the steering wheel and although conscious after the accident, later died from internal injuries. The crush velocity disclosed here, in the embodiment illustrated in FIG. 3, would have measured the crash velocity and caused the airbag to deploy in time for this and all other pole impacts since it stretches substantially across the entire front of the vehicle, i.e., from one side to the opposite side. Of course, the sensor 101 may be designed to stretch across only a portion of the front of the vehicle in which case, it would be beneficial but not required to use multiple sensors.

In a small but significant percentage of automobile crashes (less than 2%), the point of impact is outside of the main vehicle supporting structure which is typically the rails. In a common accident, a vehicle impacts a pole at approximately the location of the headlights at a slight angle and the pole penetrates into the vehicle with little resistance until it encounters the front wheel structure at which point the vehicle rapidly stops. This crash cannot be properly sensed by most, if not all, conventional airbag sensor system in use today. Electronic non-crush zone mounted sensors will either trigger late or not at all due to the very soft nature of this crash up to the point where the pole impacts the wheel structure which is too late. Since conventional crush zone sensors are usually mounted inside of the rail structure they are not in the crush zone for this crash, which is usually exterior of the rail structure. They also, therefore, would either not trigger or trigger late. The crush sensor as shown FIG. 3 projects only slightly beyond the rail structure and therefore could also miss this type of crash. The extension of the upper horizontal portions 133 and 134, however, will permit the crush sensor to trigger on this type of crash. These extensions would trigger the deployment of the airbag in this pole crash and other airbag desired crashes outside of the rail structure. This crash is, as mentioned, a soft crash and therefore there will be substantial penetration before the sensor must trigger. The upper horizontal portions 133 and 134 therefore could be angled toward the rear in the vehicle to adjust the penetration required for the sensor to trigger. Alternately, the crush velocity sensor of this invention can extend along the entire side on the vehicle almost to the B-pillar and thus can catch this crash. A crush switch sensor, on the other hand, would be too sensitive if placed adjacent the side of the vehicle. By measuring the crash velocity, as is done in the sensor of this invention, this is not a problem and the sensor can be placed as close as practical to the exterior surfaces of the vehicle.

In order for current technology crush zone sensors to sense crashes outside of the rails in time, additional sensors would have to be placed outboard of the rails. As mentioned above, even three sensors are insufficient to catch all pole crashes to the front of the vehicle and when bumper override crashes are considered, such as the low pole crash described above, additional sensors are required. A primary advantage of the crush velocity sensor of this invention is that a single sensor can be used to sense crashes to all portions of the front and most portions of the sides of the vehicle. To achieve the equivalent coverage using conventional sensors would require at least five and probably more sensors. The manufacturing cost of a sensor described in this invention is about equivalent to the manufacturing cost of a single ball-in-tube crush zone sensor. Therefore, in addition to the substantial performance advantage, there is also a substantial cost advantage in using the sensor described herein.

In addition, a significant cost in a sensor system is the cost of the wires to connect each sensor to the remainder of the airbag system. It is typical for a wire and connector assembly plus the cost of insulation to be as much as half of the cost of the sensor itself. In the sensor described herein, a single wire assembly is all that is required to connect the sensor to the airbag system. It would also be possible to wirelessly connect the sensor assembly to the airbag system. With conventional crush zone sensors, a separate wire assembly is needed for each sensor. Finally, in order to minimize the possibility of the conventional crush zone sensor from rotating during angle crashes, for example, the mounting structure, typically the upper radiator support, is frequently strengthened to provide a more rigid mounting structure for the sensor. This modification to the vehicle structure is not required for the sensor described herein and therefore additional cost savings result. Naturally, to be able to measure the velocity change of the crash, additional electronics is required that will increase the cost of the sensor of this invention compared to a pure crush switch crash sensor.

Figure 7:
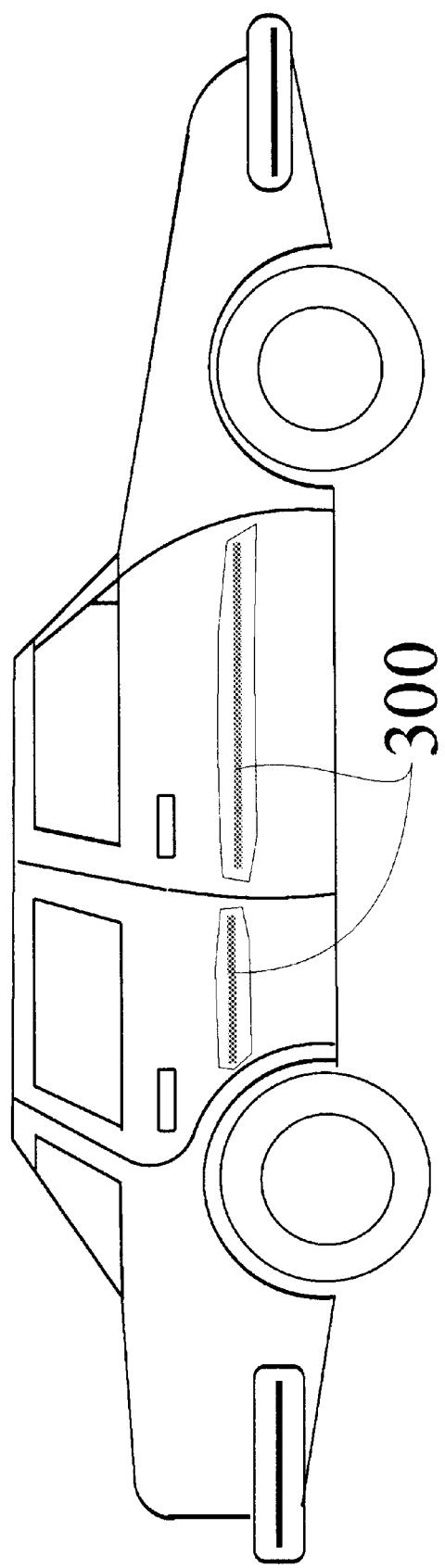
FIG. 7 is a side view of another preferred embodiment of the sensor in accordance with the invention shown mounted on a vehicle in a position to sense side impacts, with portions of the vehicle removed to permit viewing of the sensor.

As discussed above, and in several of the cited references on sensing side impacts, crush sensing alone is not the best technical solution for sensing side impacts. In spite of this fact, Volvo is now marketing a side impact airbag protection system where the sensor is a crush sensing sensor, although it is a point sensor and not a rod-in-tube geometry. In the event that other automobile manufacturers choose this approach, the rod-in-tube crush sensor described herein can be used as shown in FIG. 7 which is a side view of the sensor of this invention shown mounted on a vehicle to sense side impacts. One advantage of the rod-in-tube sensor is that it can cover a large area of potential crash sites at little additional cost. Thus, a single sensor can stretch along the entire door in whatever shape desired, e.g., linearly as shown at 300 in a position substantially parallel to the door panel. Thus, the sensor 300 would measure the crush velocity upon impact at any location along the door. This solves a potential problem with the Volvo system which requires that the crash take place at a particular location for the airbag to be deployed.

In addition, sensors could extend across the side panels of the vehicle and not only across the doors.

The use of a rod-in-tube sensor for side impacts as well as one for frontal impacts is particularly attractive since it can be easily attached to the same diagnostic module. Thus, the same Diagnostic and Energy Reserve Module (DERM) can be used for frontal, side and even rear impacts. A particularly economic system results if these sensors are used for the entire vehicle providing a simple electronic diagnostic system is used in contrast to the complicated microprocessor based systems now in use. Thus, superior protection for the entire vehicle for crashes from any direction can be obtained at a substantial cost reduction over the currently used electronic systems.

Some of the objections for the use of a crush sensing sensor for side impact are overcome by the use of the sensor to measure the crash velocity rather than pure crush. A pure crush sensor is prone to inadvertent triggering since the amount of crush in side impacts cannot be used as a measure of impact velocity due to the short triggering time requirement. The use of the sensor of this invention in conjunction with an electronic sensor for side impacts will be discussed in more detail below.

The application of the sensor of this invention for rear impacts is in theory similar to that for frontal impacts. In contrast to frontal impact, there is not yet universal agreement as to the velocity change at which the deployment of a headrest-mounted airbag is needed. Many whiplash injuries occur at very low velocity changes, as low as about 5 mph. The replacement cost for such an airbag will be substantially less than for frontal impact airbags consequently again the deployment velocity could be made lower. On the other hand, if the headrest is properly positioned, only high velocity impacts would require airbag deployment. It is important to keep in mind that whiplash injuries are the most expensive group of automobile injuries even though they are usually not life threatening. Any airbag in the headrest can cause more injury than help due to the proximity of the occupant's head to the headrest.

The choice of the marginal deployment velocity significantly impacts the location of the rod-in-tube crush switch sensor but has much less effect of the crush velocity sensor of this invention. Also, the rear end sections of automobiles differ substantially in their structure, stiffness, and suitable sensor mounting locations. In some vehicles the optimal sensor mounting location will be in the trunk lid. In others, especially if low velocity impacts are to the sensed, a location behind the bumper is appropriate. In many vehicles, the proper location for a crush switch sensor is in the middle of the trunk volume, an impractical place to mount any sensor. For the crush velocity sensor of this invention, on the other hand, this is not a problem and the sensor can be mounted at a more convenient rearward location.

Figure 8:
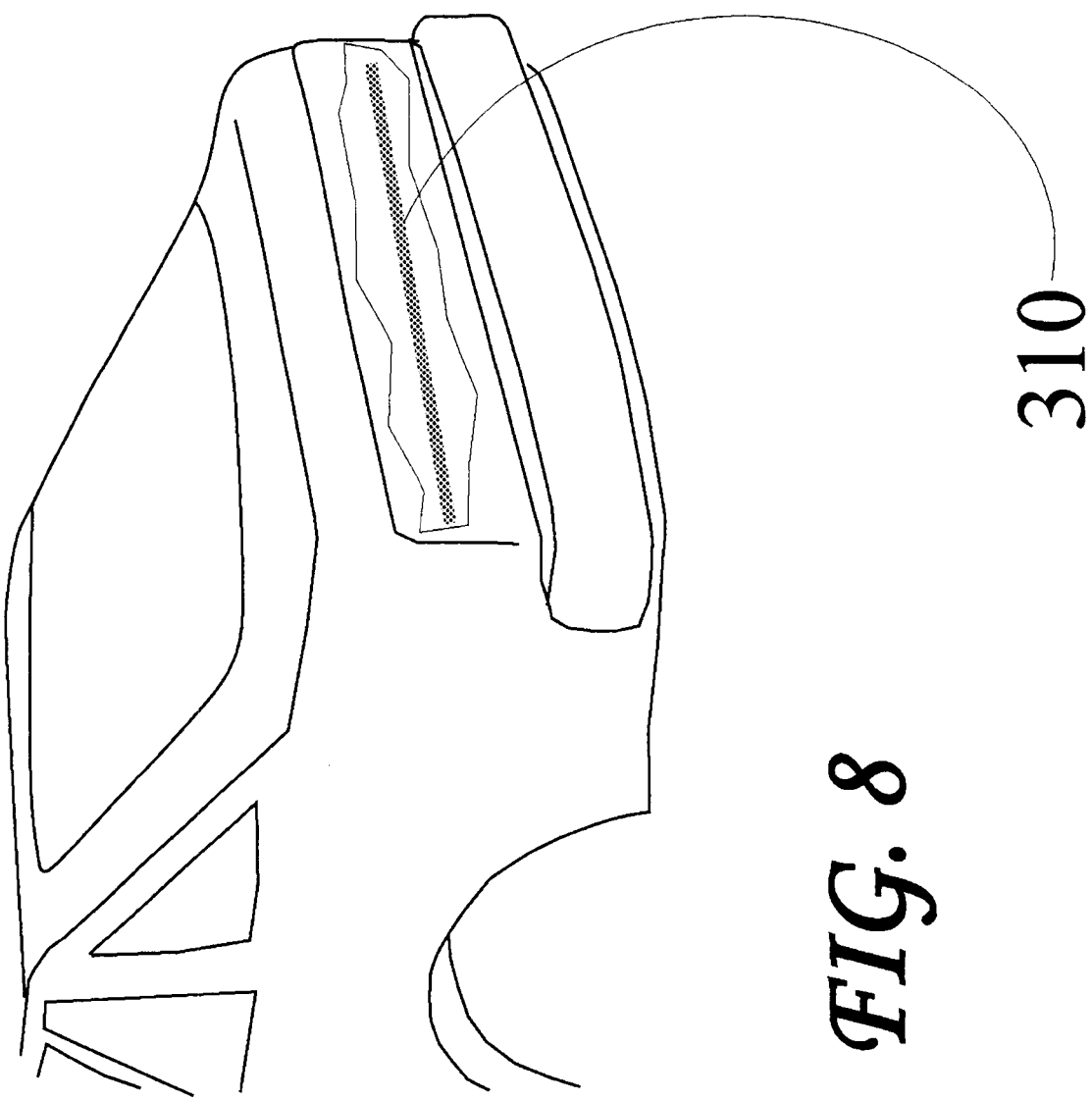
FIG. 8 is a rear view of another preferred embodiment of the sensor in accordance with the invention shown mounted on a vehicle in a position to sense rear impacts with portions of the vehicle removed to permit viewing of the sensor.

Due to this wide variability in sensor strategies and resulting sensor locations and geometries, FIG. 8 illustrates a general sensor 310 arbitrarily mounted to the rear of the vehicle to sense rear impacts, and as shown, in a position extending across substantially the entire width of the rear of the vehicle. Portions of the vehicle are removed to permit viewing of the sensor. The determination of the proper mounting position and sensor design follows the same strategy illustrated above and in the cited references.

The environment experienced by a sensor mounted in the front of the radiator on a vehicle is one of the most severe in the automobile. In addition to the extremes of temperature encountered between winter in Alaska and summer in the Arizona desert, this location is impacted by hail, stones, dust, dirt, salt water, radiator coolant, steam cleaner and occasionally even battery acid. This sensor must be capable of surviving any combination of these environments for the useful life of the car which is typically considered to be in excess of ten years. It is important, therefore, that this sensor be hermetically sealed. A great deal of effort has been put into the current ball-in-tube crush zone sensor to seal it from these environmental influences. Nevertheless, sensors that have been on vehicles have been dissembled and found to contain moisture. Although moisture would not have as detrimental effect to the rod-in-tube sensor described here as it does to ball-in-tube sensors, the sensor has nevertheless been designed to be truly hermetically sealed as described below.

Figure 9:
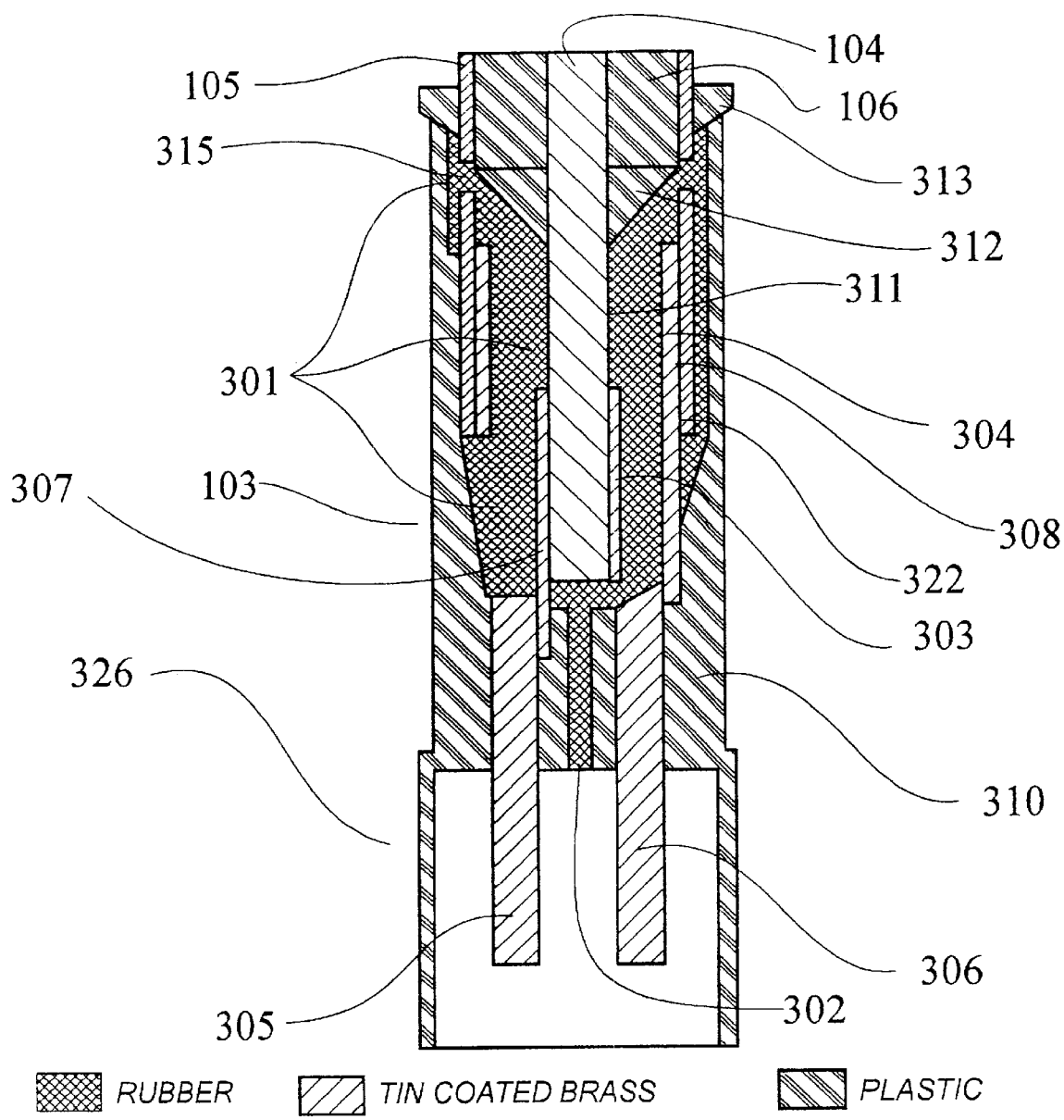
FIG. 9 is a cutaway view of the header/connector assembly of FIG. 1, taken along line 9—9, illustrating the construction details and in particular the method of sealing the sensor.

FIG. 9 is a cross section view of the header/connector assembly 103 shown mounted on the tube 105 and rod 104. One of the spacers 106 is used to position the rod 104 inside the tube 105 as described above. The primary seal for this sensor 101 is injected and cured in place and is urethane or a silicone rubber compound 301.

Current ball-in-tube crush zone sensors are attached to the vehicle wire harness and, thus to the remainder of the airbag system, by means of a pigtail which is a wire assembly emanating from the sensor at one end and having a connector at the other end. It is believed that the environment in front of the radiator is too severe for connectors, therefore connectors integral with the sensor have not been considered. This pigtail is one of the most expensive parts of the standard ball-in-tube crush zone sensor. Substantial cost savings result if the connector could be made integral with the sensor. This has been accomplished in the crush switch sensor of the current design as shown in FIGS. 1, 3 and 9.

The sealing technique used for the header/connector is to form a rubber mold within the housing and to pump a rubbery material such as urethane or silicone rubber, or similar compound, 301 into the cavity. This is accomplished in such a manner that the air is displaced and forced to flow through various clearances between the parts in much the same manner as air is forced out of a plastic injection mold when the liquid plastic is forced in under pressure. The rubber compound 301 is injected through hole 302 in the bottom of the connector portion of the assembly and flows upward as the air flows out through holes or slots 315 in tube 105 and finally out of the assembly through the clearance between the tube 105 and a plastic dam 313. The plastic dam 313 is a part which fits snugly to the tube and also against a plastic header body 310 of the header/connector assembly 103. These snug fits permit the air to flow while offering a substantial resistance to the flow of the rubber 301. In this manner and through the proper geometric shaping of the various parts, all but a few minute air bubbles are effectively removed and the rubber thereby attaches and seals to all of the relevant surfaces.

A second dam 312 is also used to limit the passage of the rubber into the main body of the sensor 101. The spacers 106 typically contain a groove to permit the passage of grease, as will be explained below, and the dam 312 effectively seals this area and prevents passage of the rubber. Since the grease is typically pumped into the sensor 101 after the header/connector assembly 103 is assembled, this last spacer 106 adjacent to the header/connector assembly 103 need not have the groove and thus the dam 312 and spacer 106 can be made as one part if desired.

The seal is thus made by the steps of:
a) assembling the header/connector assembly 103 to the rod-in-tube assembly 104/105 creating at least one enclosed cavity therein having at least one inlet port 302 for injecting a rubber compound and at least one narrow passage for air to escape (the clearance between tube 105 and dam 313), this passage being sufficiently narrow as to permit only a small amount of rubber compound to flow out of the assembly during the filling process, but large enough to permit air to easily flow out of the assembly;
b) injecting an uncured rubber compound through the inlet port(s) in such a manner that the at least one narrow passage remains open during the injection process until the cavity is substantially filled permitting air within the cavity to be displaced by the rubber compound; and
c) curing the rubber compound.

Usually a room temperature curing rubber compound is used and thus the curing process comprises storing the assembly until the curing is complete. In many cases, the temperature of the assembly is elevated to accelerate the curing process and in others, the rubber is exposed of ultra violet light to effect the cure.

Tests were run on this system whereby the assembly was held at about −40 degrees Celsius for at least twelve hours and then immersed into boiling water and then into near freezing water containing a penetrating die. After tens of cycles, the test units were cut open to search for the penetration of the die which would indicate a failure of the seal. None was found. In contrast, a commercially available ball-in-tube sensor failed on the first cycle. This test is more severe than any sensor is likely to experience in the field and therefore proves the viability of the sealing system.

A preferred plastic material used for the header/connector is 30% glass filled polyester although other plastic materials would work as well. Standard crush zone sensor connectors are frequently made from unfilled Nylon and this would also be suitable for the header/connector design used in the sensor of this invention. Although unfilled Nylon has a high coefficient of thermal expansion, the urethane or silicone rubber has even a higher one and therefore the seals between the nylon and metal parts will remain intact.

The lower portion 326 of the header/connector assembly 103 shown in FIG. 9, is in the form of a mating connector which attaches to the wire harness connector provided by the automobile manufacturer. Connector pins 305 and 306 are extensions of the header pins 303 and 304, which are connected to the rod 104 and tube 105, respectively, and are designed to mate with the appropriate connector, although not shown in detail here. Connector pins 305 and 306 are made of an electrically conductive material. Upon completion of the circuit via contact between the rod 104 and the tube 105 upon a crash, current flows through the connectors 305, 306, header pins 303, 304 and rod 104 and tube 105. The header pins 303, 304 are formed from, e.g., sheet brass, in such a manner that they surround the rod 104 and tube 105 and are electrically connected thereto. This is accomplished in the case of the tube, for example, by solder coating the end 322 of the tube 105. A mating portion 308 of the header pin 304 fits snugly inside the tube and, through induction heating, is soldered to the tube. Similarly, mating portion 307 of header pin 303 surrounds the rod 104 which has been solder coated at its end 311.

The header pins 303 and 304 are first formed from, e.g., tin-plated brass material, to the proper shape and then placed in a mold in an insert molding operation to form the header/connector assembly 103. Note that a reflection will come from the different impedance in the connector but it will be at a known position and can be ignored.

Figure 10:
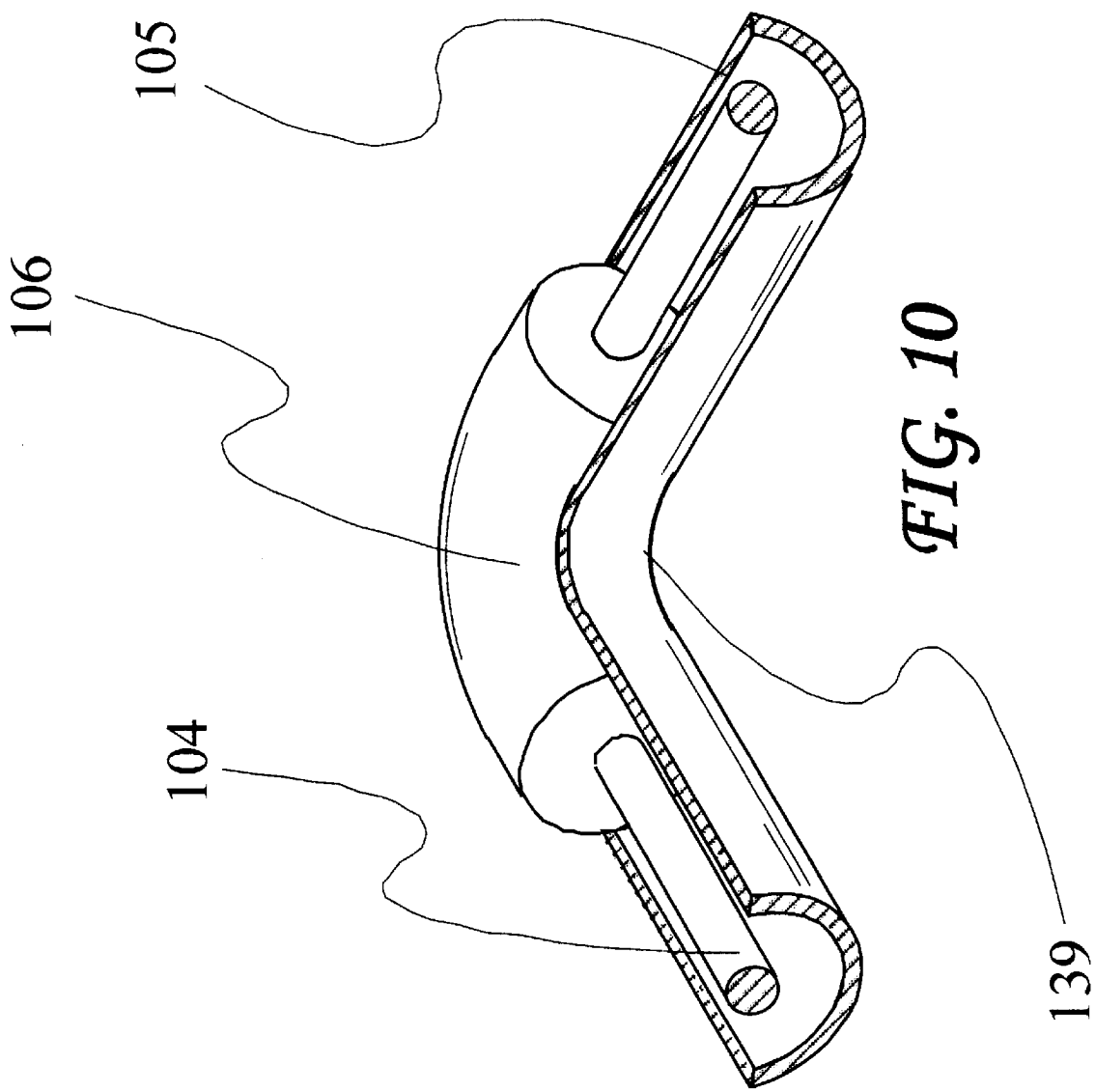
FIG. 10 is a partial cutaway view of a portion of the sensor illustrating a bend in the sensor.

Spacers 106, in addition to their use in a straight portion of the rod and tube assembly as shown in FIG. 2, are also placed in each of the bends 139. A partial cutaway view of a typical bend 139 is shown in FIG. 10. During assembly the spacers are placed on the rod and the rod is inserted into a straight tube with the spacers 106 located at each position where the tube will be bent. The tube is then bent at spacer locations using conventional tubing benders and the rod is also forced to bend by virtue of the spacer. The spacers are formed from extruded plastic tubing and are slightly smaller in diameter than the tube. The internal diameter of the spacer, however, is such as to require a press fit onto the rod. Thus, the spacers 106 are held firmly on the rod 104 as the rod 104 is inserted into the tube 105. Spacers used in the bends are typically about 3 inches long when used with a 0.5 inch tube and a one inch bend radius.

In a typical large tube assembly, the tube outside diameter is approximately 0.5 inch and the wall thickness approximately 0.035 inches and in a small tube assembly the outside diameter is approximately 0.25 inches and the wall thickness is about 0.02 inches. The large tube design is used when there is no convenient structure to mount the sensor against and it is vulnerable to abuse, while the thin or small tube design is used when it can be mounted nearly flush against the radiator support, for example, or in a protected location such as inside of the vehicle door.

Figure 11:
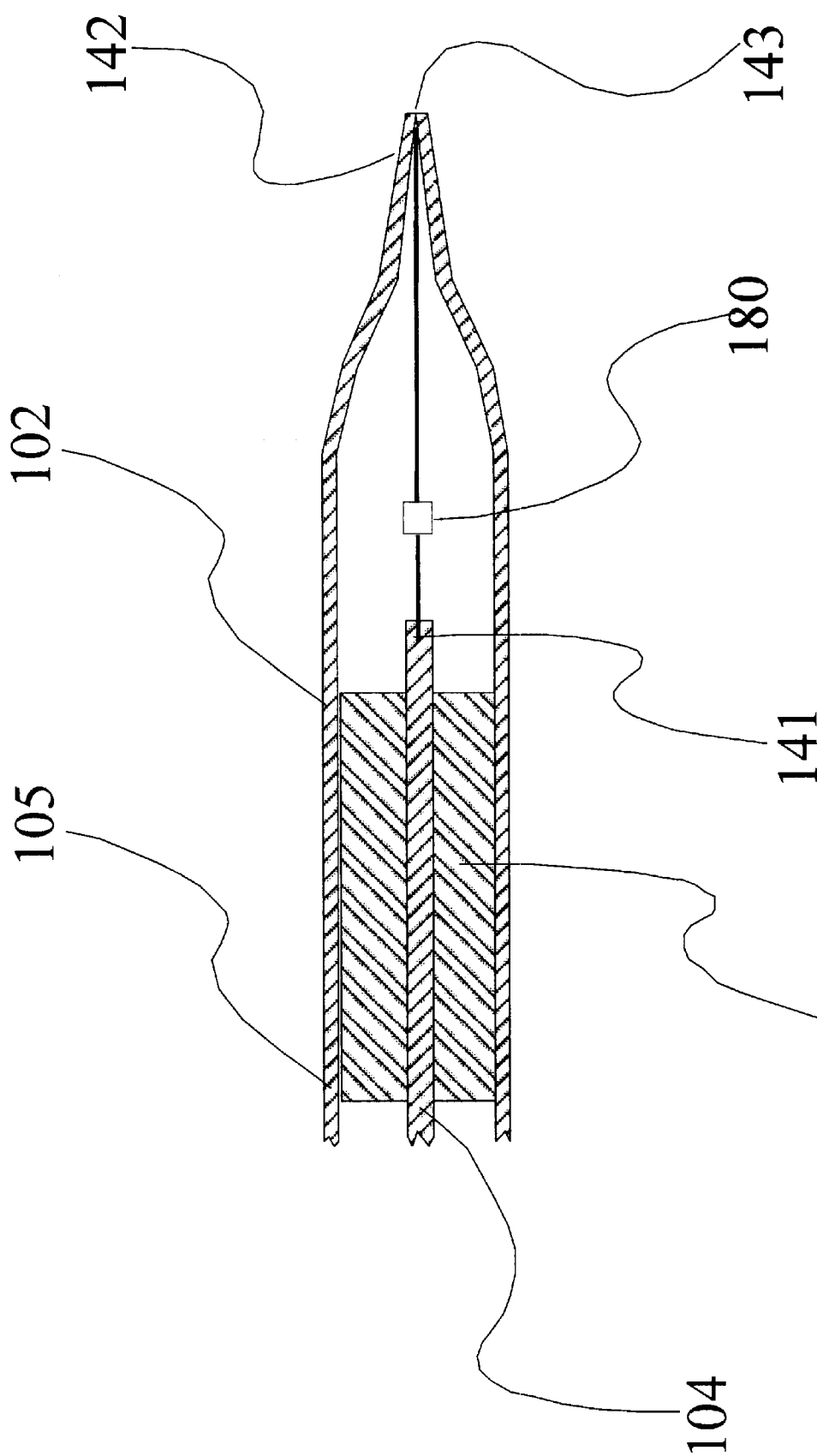
FIG. 11 is a cutaway of the sensor end showing the welded seal.

The end 102 of the sensor 101 which does not have the header/connector 103 is welded closed as shown in FIG. 11. A impedance such as a resistor is placed across the contacts in the sensor 101 to create the reflection at the end on the sensor. This is accomplished as shown in FIG. 11 by attaching a resistor 180 to an end 141 of rod 104 and to an end 142 of tube 105. The end 142 is formed by squeezing the tube in the appropriate set of dies which gradually taper and flatten the tube, squeezing the end of resistor 180 and closing off the tube with a straight line seal. The end of this seal, 143, is then TIG welded using conventional equipment to assure a hermetic seal.

Figure 12:
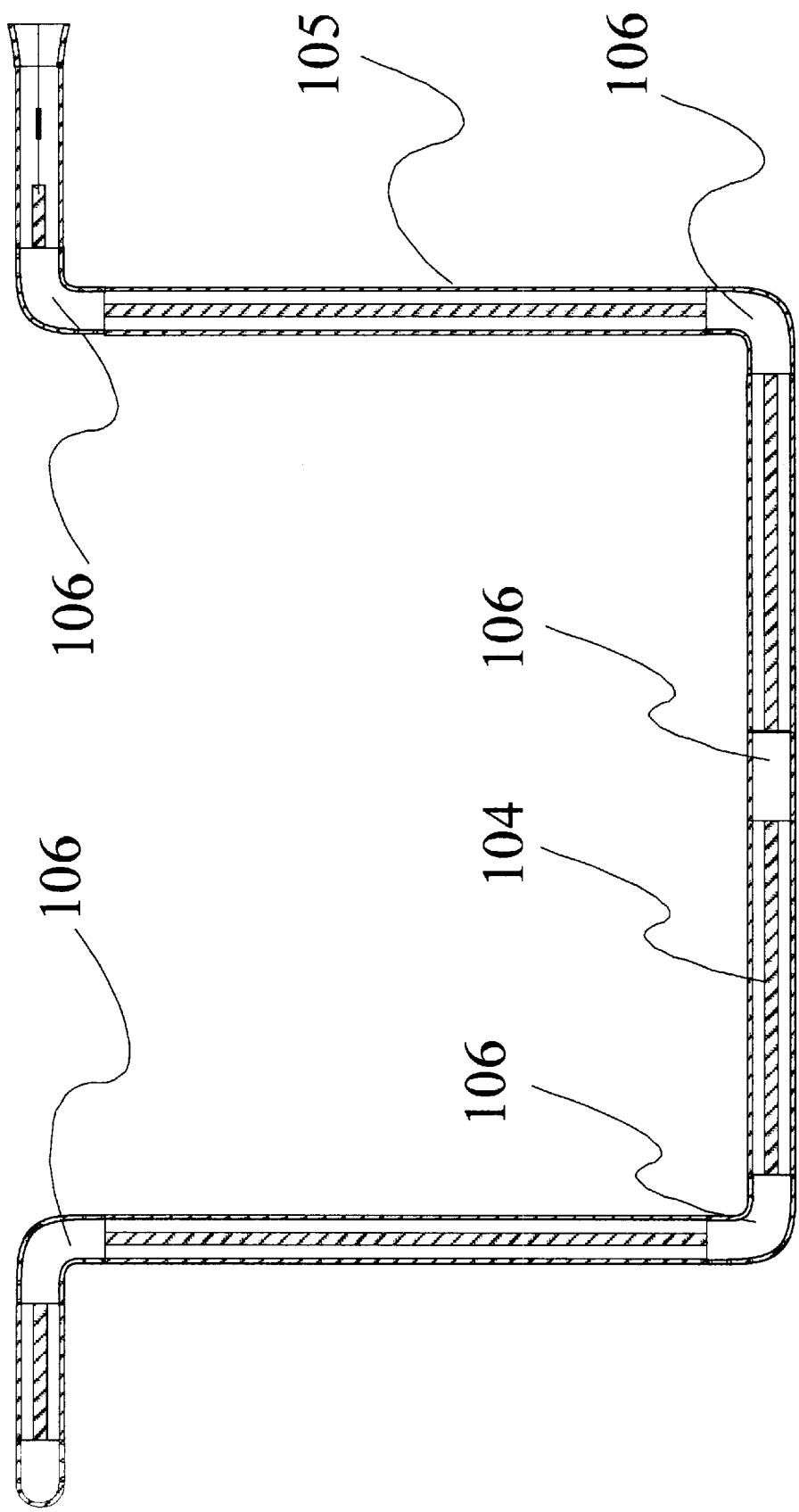
FIG. 12 is a view of the sensor of FIG. 1 with part of the tube and rod cut away illustrating the positioning of spacers within the sensor and their use to change the sensitivity of the sensor to deformation.

FIG. 12 is a view of the sensor of FIG. 1, with half of the tube 105 and rod 104 removed but showing complete spacers 106, taken along lines 12—12 and showing the location of all of the spacers 106 and the rod 104 and tube 105.

If the passenger compartment discriminating sensor is of the electronic type, the triggering threshold can be changed based on the crush velocity as measured by the sensor of this invention in the crush zone. Passenger compartment sensors sometimes trigger late on soft long duration frontal crashes even though the velocity change is significantly higher than the desired deployment threshold (see, for example, reference 4 above). In such a case, the fact that the crush velocity sensor has determined that a crash velocity requiring an airbag is occurring can be used to modify the velocity change required for the electronic passenger compartment mounted sensor to trigger. Thus, in one case, the passenger compartment sensor can prevent the deployment of the air bag when the velocity change is too low as in the animal impact situation discussed above and in the second case, the crush zone sensor can cause the discriminating sensor to trigger faster in a soft crash and minimize the chance of a late triggering condition where the occupant is out of position and in danger of being injured by the deploying air bag.

Figure 13:
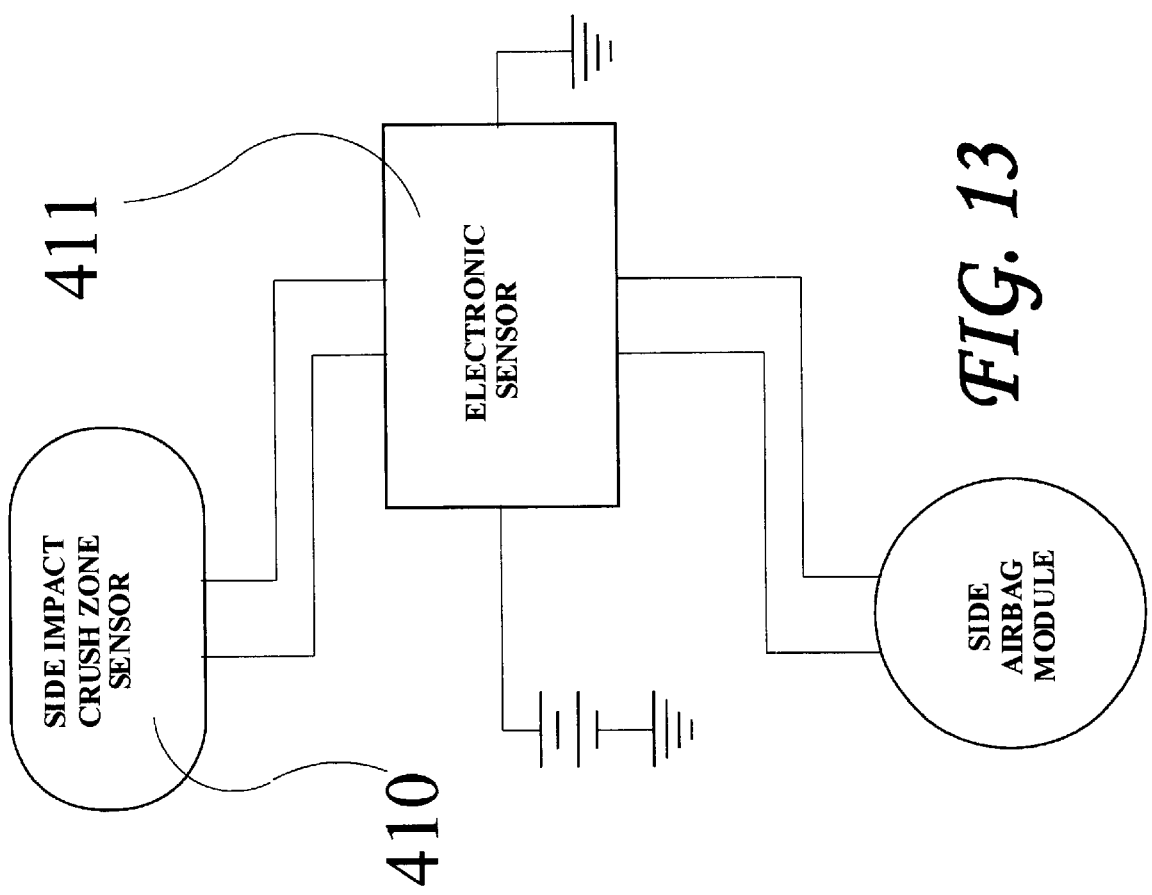
FIG. 13 is a circuit schematic showing a side mounted velocity sensor used with a non-crush zone mounted sensor.

FIG. 13 shows schematically such a circuit applied to side impacts where an electronic sensor 411 triggers deployment of the side airbag resident in a side airbag module and crush velocity sensor 410 is used as input to the electronic sensor 411. The electronic sensor could be mounted in the passenger compartment but designed with a very low threshold. Its purpose is to verify that a crash is in progress to guard against a hammer blow to the sensor setting off the airbag. In this case, the current carrying capacity of the crush sensor 410 can be much less and thinner wires can be used to connect it to the electronic sensor 411. In one scenario, the electronic sensor may be monitoring an event in progress when suddenly the crush sensor signals that the vehicle has crushed with a high velocity where the sensor is mounted. The electronic sensor 411 now uses this information along with the acceleration signal which it has been monitoring to determine the severity of the crash. The crush velocity sensor 410 informs the electronic sensor 411 that a crash of a certain velocity is in progress and the electronic sensor 411, which comprises an accelerometer and a microprocessor with a crash analysis algorithm, determines the severity of the crash based on the acceleration signal and the crush velocity. If the acceleration signal is present but the crush sensor 410 fails to record that a crash is in progress then the electronic sensor 411 knows that the acceleration signal is from either a non-crash event or from a crash to some part of the vehicle, such as in front of the A-pillar or behind the C-pillar where deployment of the airbag is not warranted. The A-pillar is the foremost roof support member on which the front doors are hinged and the C-pillar is the rearmost roof support pillar usually at or behind the rear seat.

An example of an electronic crash sensor algorithm can be found in patent application to D. S. Breed titled "Method and Apparatus for Sensing a Vehicle Crash," Ser. No. 08/476,076, filed Jun. 7, 1995.

Figure 14:
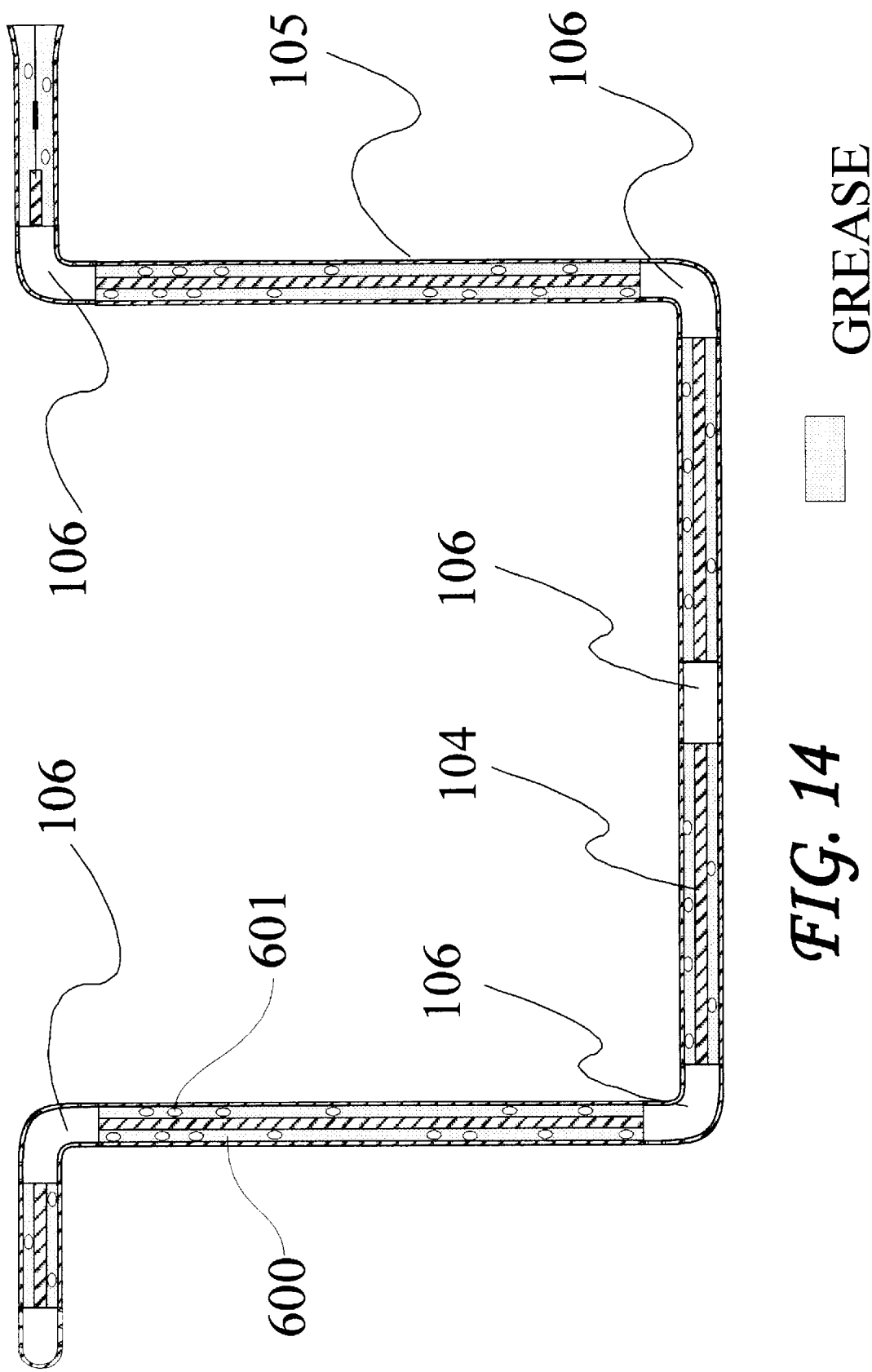
FIG. 14 is a view of the sensor of FIG. 1 with portions of the tube and rod cut away illustrating the use of a grease to fill the cavity between the rod and tube to minimize the effects of vibration and to protect the surfaces of the conductors from corrosion.

A typical length of the span between spacers for the vertical portions 130 and 131 of FIG. 1 is approximately 10–15 inches. In this configuration, the rod 104 will actually deflect and contact the tube during minor accidents and therefore in the preferred embodiment of the design, the tube is filled with a damping material which is typically a viscous liquid or grease which has been formulated to operate over the required temperature range of from about −40 C to 125 C. This grease should have approximately the same dielectric constant as the plastic spacers to minimize extraneous echoes. For the purposes of this disclosure, the term grease will be used to include all flowable materials having a viscosity between 100 and 100 million centipoise. This would include, therefore, all silicone and petroleum and other natural and synthetic oils and greases in this viscosity range. This grease 600 is shown in FIG. 14 where half of the tube 105 has been removed to show the grease 600 filling substantially the entire tube. Small voids 601 are intentionally placed in the grease to allow for differential expansion between the grease and the tube due to variations in temperature. When grease is used, small channels, not shown, are provided in the spacers 106 to permit the grease to flow past the spacers as the sensor is pumped full of the grease.

The sensor described and illustrated above is designed to catch all impacts to the vehicle regardless of where they occur providing the sensors are properly located. For frontal and rear impacts the severity of the crash required to cause sensor triggering is determined by the amount of crush of the vehicle at each location which is necessary to cause the sensor to experience a measurable and timely velocity change. The amount of crush necessary to transmit this velocity change to relative motion of the rod in the tube at any location can be varied arbitrarily by the distance the sensor is located from the front or rear of the vehicle, by the location and characteristics of spacers in the sensor and by the location and characteristics of the supports that are used as discussed above.

Steel has been used for the materials for the rod and tube for the preferred embodiment described herein. The tube is in an annealed state to promote easy forming to the required shape and to promote deformation during the crash. The rod, on the other hand, is typically hardened so as to maintain its spring temper and promote good positioning with the tube when the combination is bent. The outside of the sensor is coated with a protective coating to prevent it from rusting during the estimated 10 year life of the vehicle. The interior surfaces are coated with grease to prevent corrosion in those cases where the entire sensor in not filled with grease. Naturally, other materials such as aluminum, brass or even plastic with an electrically conductive surface coating could be used for the rod and tube.

The rod and tube described above, for the large tube design, have been designed to require approximately fifty to one hundred pounds of force in order to cause the sensor to significantly bend. This is to minimize the chance of inadvertent deployment during routine vehicle maintenance. For cases where the sensor is in a protected location, the small tube design typically uses about a 0.25 inch diameter tube with about a 0.0625 inch diameter rod.

Once the crush velocity sensor of the present design bends significantly to where the rod contacts the tube, it remains latched in the conductive state for the duration of the crash. This important feature as discussed in detail in the above referenced patent applications, guarantees overlap between the triggering of the crush zone sensor and the passenger compartment mounted arming sensor when used for frontal and rear impacts.

The sensor described and illustrated herein utilizes an impedance such as a resistor. In contrast to many sensor designs, monitoring of the entire functioning of the sensor continuously occurs with the crush velocity sensor of this invention. The driving and control electronics continuously transmit waves into the sensor and monitor the reflections that are returned. Thus, if there is a broken connection for example, the system will not get the expected return and can signal to the airbag system to display a fault.

The tube of the sensor described herein can be electrically grounded to the vehicle. In some applications, it may be desirable not to ground the outside of the tube in which case the tube would be surrounded by an insulating plastic tube. The use of a grounded outer tube has the advantage of providing shielding from electromagnetic radiation for the rod and thus minimizing the chance of an inadvertent signal reaching the electronic sensor, for example, as the vehicle passes through strong electromagnetic fields.

A primary advantage of the sensor described herein is its coaxial design which permits arbitrarily shaping of the sensor to adapt the sensor to a particular vehicle and to a particular place on that vehicle. There are, of course, other designs which could also be arbitrarily shaped including, but not limited to, tubes having a square, elliptical or triangular cross section. All of these and similar geometries are considered tubes for the purpose of this invention. Similarly, the rod can take on a variety of shapes without departing from the teachings of this invention. In particular, the rod can also be a tube which has advantages in minimizing the effects of vibration. The rod need not be round and can be triangular, elliptical, square or even ribbon shaped. All of these geometries are considered rods for the purposes of this invention.

Another key feature of this invention is that, when the sensor is properly mounted on the vehicle, plastic deformation of the tube generally occurs prior to triggering of the sensor and always occurs in a crash where the deployment of the airbag is required. As discussed above, this results in the sensor latching closed during the crash but is also prevents it from being reused on the same or another vehicle. In an alternate configuration, the dimensions of the rod and tube and the material properties are chosen so that the sensor can be caused to trigger with sufficient force without causing plastic deformation. This usually permits a more accurate estimation of the crash velocity.

The use of grease to dampen the motion of one or more of the parts of a crash sensor has been disclosed herein. Other crash sensor designs, and particularly crush switch sensor designs, could also make use of a grease to surround and dampen the motion of one or more of the internal parts of the sensor.

The hermetic sealing system disclosed herein has permitted the first use of an integral header/connector thus eliminating the need for the pigtail and substantially reducing the cost of airbag sensors for frontal mounting in the "splash zone". Naturally, now that this system has been disclosed other applications of this system to other types of crash sensors will become obvious to those skilled in the art.

In another implementation, the crash velocity can be determined through the use of two crush switch crash sensors. If two sensors of the type disclosed in the inventions cross referenced above are mounted on a vehicle with one closer to the front than the other, then, during a crash, the forwardmost sensor will trigger first followed by the second more rearward sensor. If the spacing between the sensors is known, an estimate of the crash velocity can be obtained by measuring the time between switch closures. In this manner, the use of two switches can be used to determine the crash velocity. This concept can be further improved if the phase measurement system of this invention is added. In this cans, therefore, the location of the contact will be determined in each crush switch and then the velocity determined as above. This is another method of obtaining both the velocity change and the location of the impact and is perhaps more accurate that the single sensor system.

Figure 15:
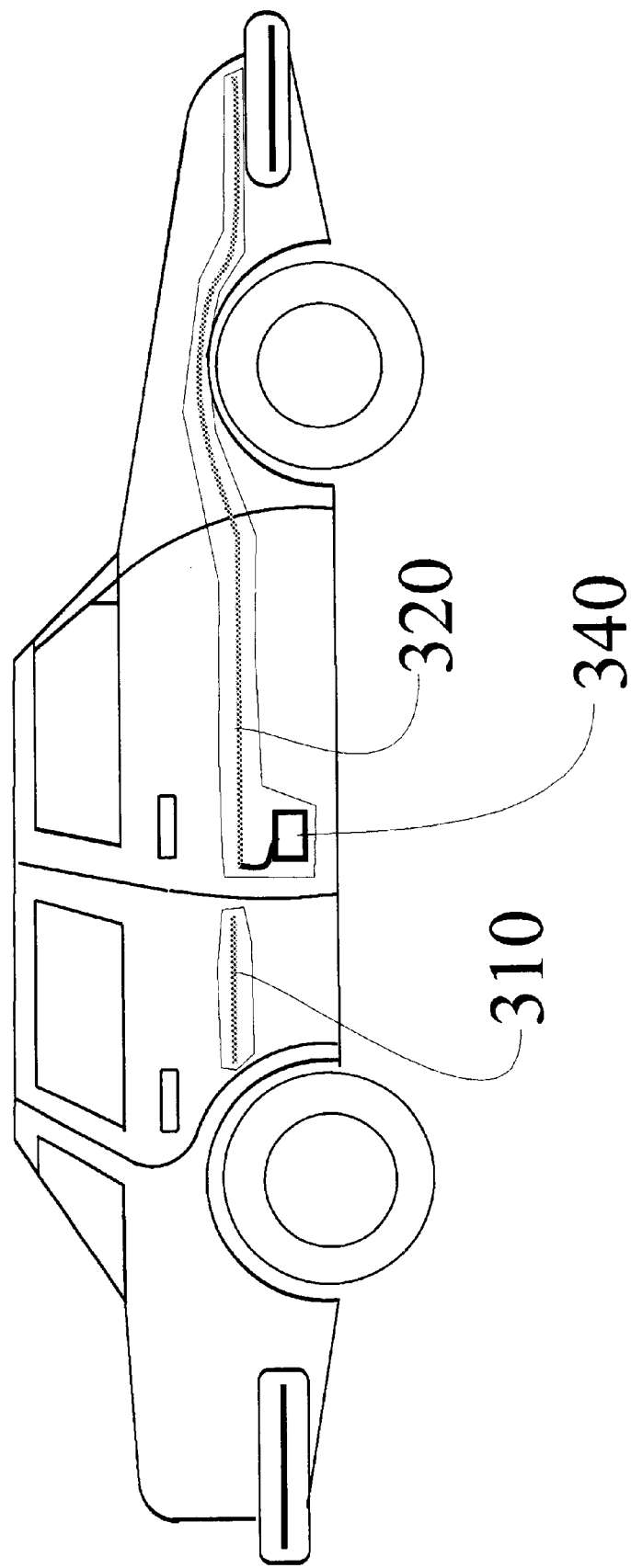
FIG. 15 is a side view of another preferred embodiment of a sensor in accordance with the invention shown mounted on a vehicle in a position to sense both frontal and side impacts, with portions of the vehicle removed to permit viewing of the sensor.

For cases where actuation by bending of the sensor is not required and the sensor can be configured to reliably be impacted during the crash, a coaxial cable design is appropriate. In this case, a cable is selected which will deform under a 10 to 500 pound load in a manner such that the impedance change that occurs during the deformation can be measured. Since in most cases, the resisting deformation force is small compared with the crush forces of an accident, an appropriately mounted cable should provide an accurate measurement of the crash velocity. Such a sensor can be configured such that a single sensor will sense crashes from near the B-pillar on the driver side, across the entire front of the vehicle to near the B-pillar on the passenger side as shown as 320 in FIG. 15. The sensor would thus have a substantially U-shaped portion and would extend substantially completely across the front doors between longitudinal edges of the doors. In one embodiment, an electronic control module 340 including a processor is mounted in the passenger door and feeds electromagnetic waves, generated by an electromagnetic wave generator, having a wavelength on the same order as the length of the coaxial cable into cable 320. A similar sensor can also be used for the rear doors as shown at 330, and would thus extend substantially completely across the rear doors between longitudinal edges of the doors. This device acts like a time domain reflectometer. That is, the magnitude and location of any changes in impedance are measured. A change in impedance can be related to the magnitude of the crush of the cable and thus by successive measurements of the change in impedance, the crush velocity can be determined by a processor, possibly embodied in the control module 340. In this case, the outside conductor of the coaxial cable is grounded and the interior conductor acts as an antenna. The cable is terminated in the driver door with an impedance-matching resistor to complete the assembly.

Knowledge of the location of the impact, e.g., as detected using the coaxial cable sensor described above, can be used to enhance and improve the effectiveness of an occupant restraint system. For example, if an algorithm is used to control the deployment and operation of occupant restraint devices, the algorithm can be designed to consider the location of the impact, e.g., by factoring in the location of the impact when determining which airbags to deploy and the inflation of those airbags. In some crashes, it might be the case that only the side airbags are deployed if the crash location is along the side of the vehicle. On the other hand, it might be the case that only the front airbags are deployed in the crash location is in the front of the vehicle. Of course, both the front and side airbags could be deployed if such deployment is warranted by the impact location.

Furthermore, knowledge of the impact location, as detected using the coaxial cable sensor described above, can be used to alter the interpretation of the acceleration signal provided by the passenger compartment sensor, if such is deemed beneficial. This may provide an advantage in that a decision to deploy an occupant restraint device is made earlier than normally would be the case if the location of the impact location were not considered in the control of the occupant restraint devices.

Figure 16:
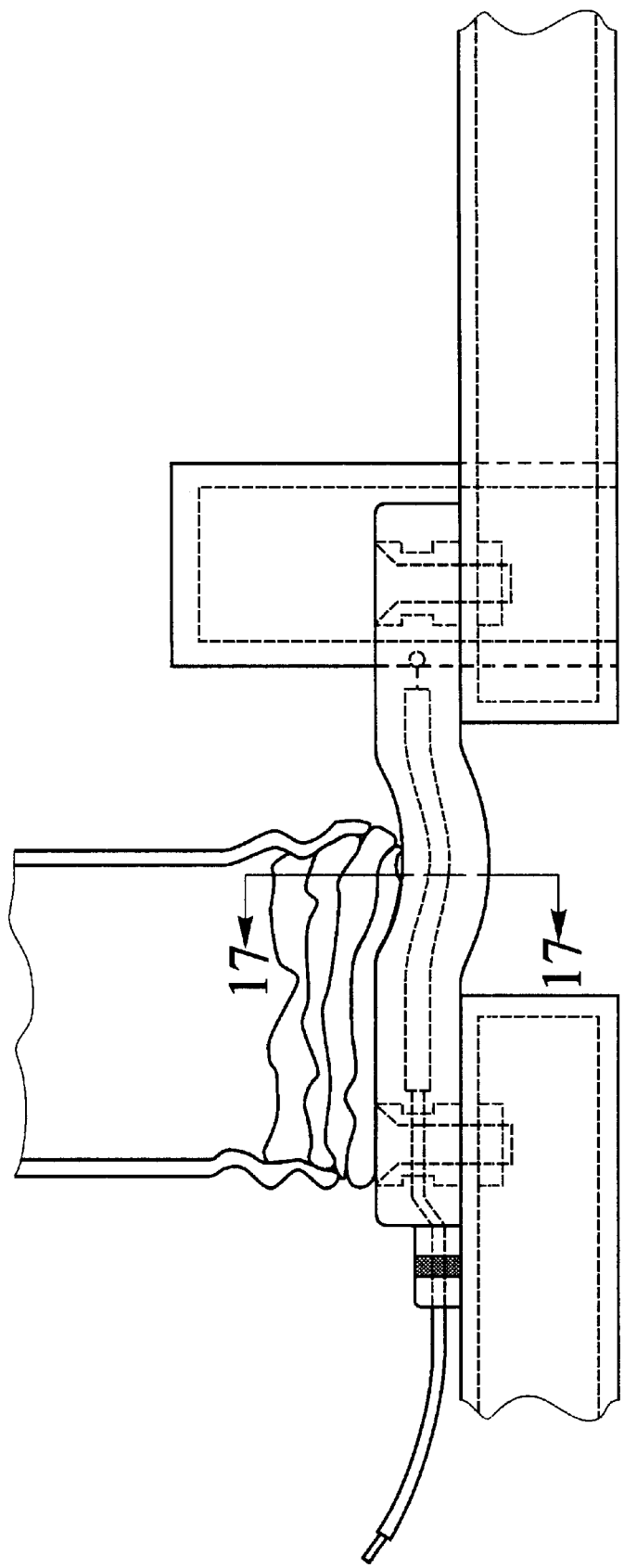
FIG. 16 is a plane view of the sensor as shown in FIG. 15 with the sensor in the actuating condition upon being impacted by crushed material in a crash.
Figure 17:
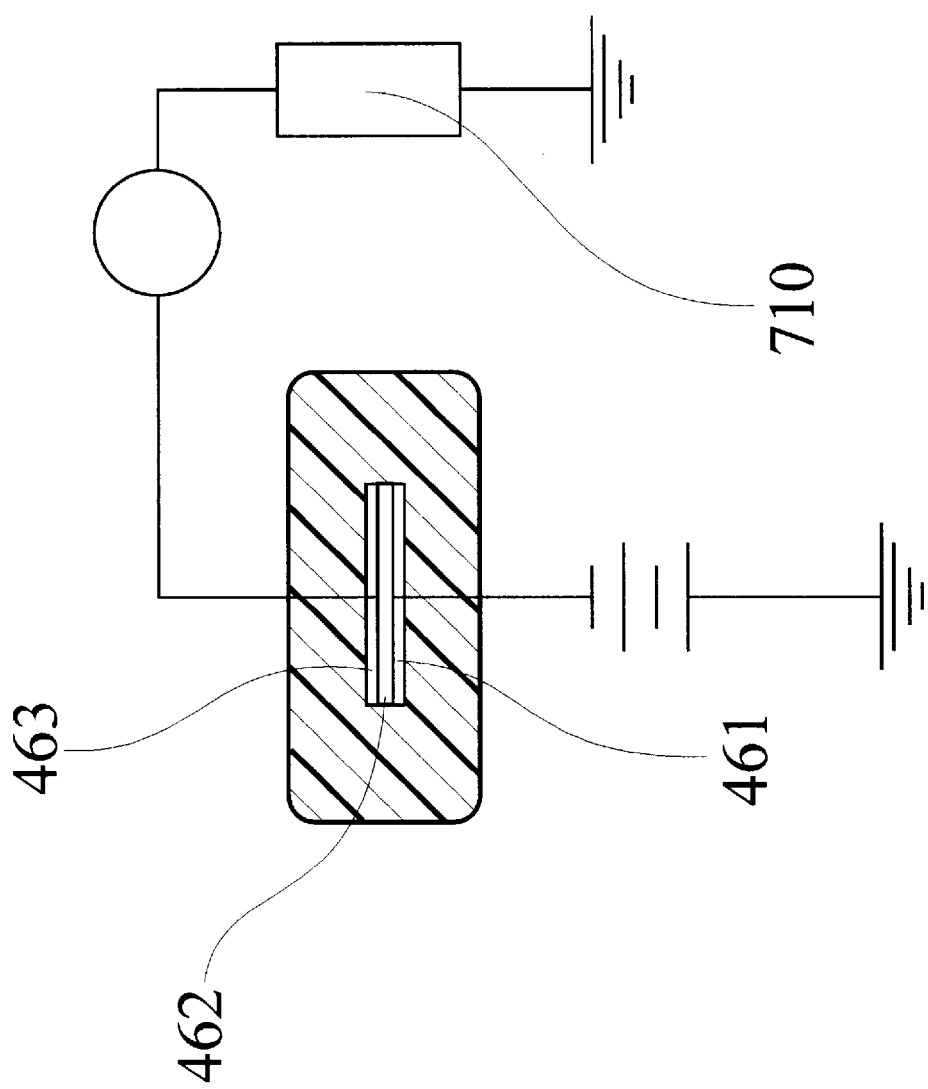
FIG. 17 is a cross section view of a different arrangement of a sensor wherein two elongate parallel plates as in a tape switch are used instead of a coaxial cable or a rod-in-tube construction, and also including a schematic of the remainder of the actuating circuit.
Figure 19:
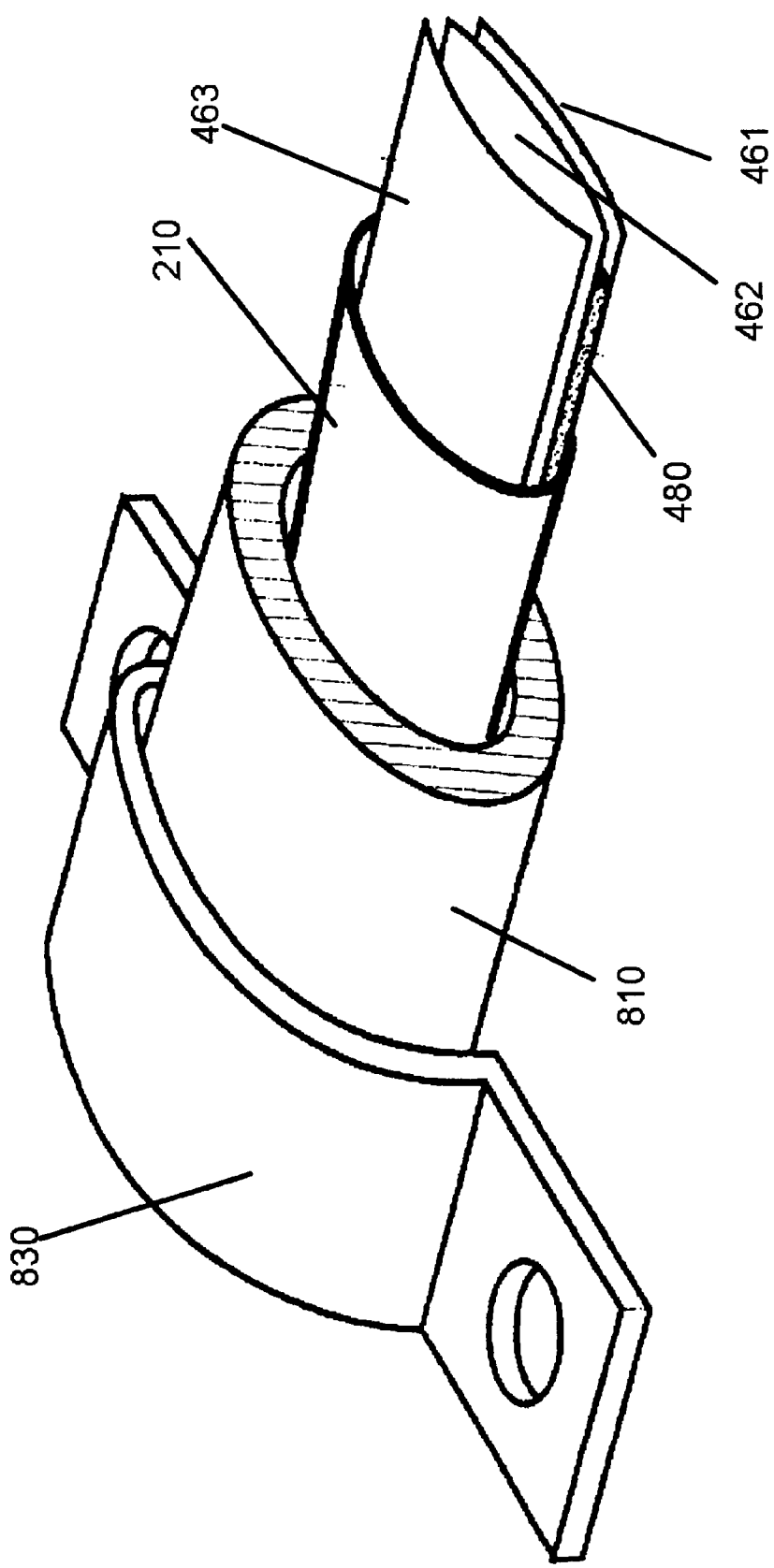
FIG. 19. is a perspective view, with portions cut away, of the flex action tape switch shown in FIG. 17.

Another embodiment of the invention uses parallel strips of conductive material and is sometimes referred to as a tape switch sensor, a short version of which is shown in FIGS. 16, 17 and 19. Naturally, the flat strip geometry could also extend over significant distances in the vehicle as with the rod-in-tube construction. The flat strip geometry is more difficult to form into arbitrary shapes than the rod-in-tube or the coaxial cable geometries. This case illustrates that the sensor can be activated by a pressure at any point between the insulators which causes a contact strip 461 to bend toward contact strip 462 as shown in FIG. 17 wherein the impedance is changed. In addition, when the sensor is bent, as shown in FIG. 16, contacts strips 461 and 462, and strip 463 resist the bending force until this force becomes sufficient to cause all three of the strips to become flat at one point along the tape switch as shown in FIG. 17. Nevertheless, for the pure compression case the impedance will change in a predictable manner as the tape is compressed and once again, based on the compression of the tape, the crush velocity can be determined by analyzing successive impedance measurements. This flattening occurs between the insulator pads, and causes contact strips 461 and 462 to touch completing an electrical circuit as shown in more detail in U.S. patent application Ser. No. 09/452,735 referenced above.

FIG. 17 shows the strips 461, 462, 463 encapsulated in an elastomeric material. Also, the tape switch sensor is used in series with a non-crush zone discriminating sensor 710 (which may be arranged to trigger based on a reaction of the entire vehicle or a part thereof to the crash, e.g., velocity change and/or acceleration, of functions thereof). In this case, the non-crush zone sensor 710 could be made more sensitive and would trigger earlier in certain crashes.

FIG. 19 shows the strips 461, 462, 463 enclosed by a protective cover 210 and then encased in a plastic or metal tube housing 810 which is retained by brackets 830 to the vehicle. Insulator pads 480 are optionally provided between contacts strips 461 and 462.

Figure 18:
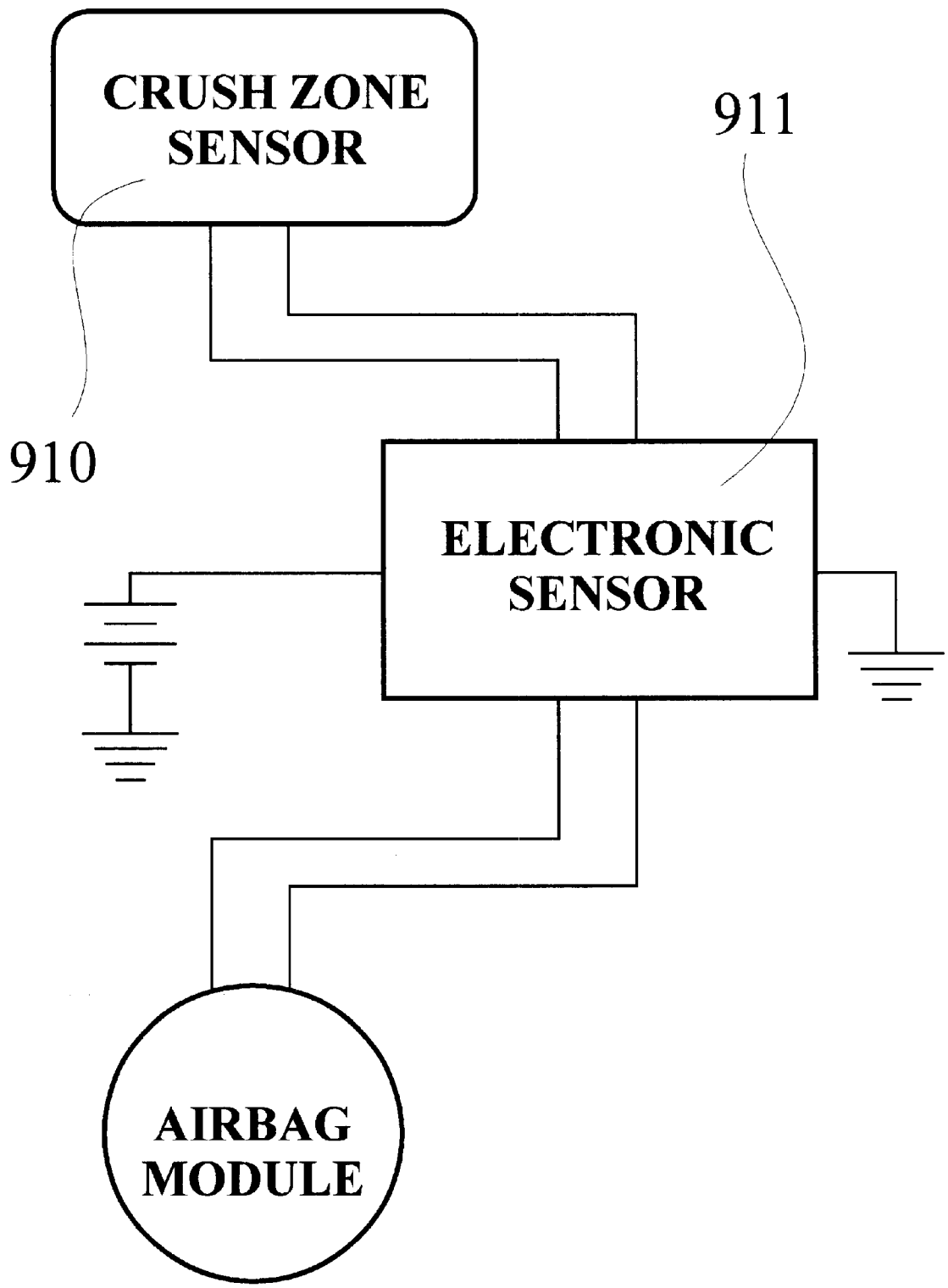
FIG. 18 is a circuit schematic showing a forward mounted sensor used as an input to an electronic sensor.

If the passenger compartment discriminating sensor is of the electronic type, the triggering threshold can be changed based on the condition of the sensor in the crush zone. Passenger compartment sensors sometimes trigger late on soft long duration crashes even though the velocity change is significantly higher than the desired deployment threshold. See for example, Breed, D. S. and Castelli, V. *Are Barrier Crashes Sufficient for Evaluating Air Bag Sensor Performance?*, SAE Paper No. 900548. In such a case, the fact that the crush velocity change sensor in the crush zone indicates that deployment of an airbag is required, can be used to modify the velocity change, or other parameters, required for the electronic sensor in the passenger compartment to trigger. Thus, in one case, the passenger compartment sensor can prevent the deployment of the air bag when the velocity change is too low as in the animal impact and in the second case, the crush zone sensor can cause the passenger compartment sensor to trigger faster in a soft crash and minimize the chance of a late triggering condition where the occupant is out of position and in danger of being injured by the deploying air bag. FIG. 18 shows schematically such a circuit where an electronic sensor 911 triggers deployment of the air bag and crush zone velocity sensor 910 is used as input to the electronic sensor. In this case, the current carrying capacity of the crush zone sensor can be much less and thinner wires can be used to connect it to the electronic sensor. In one scenario, the electronic sensor may be monitoring a crash in progress when suddenly the front crush zone sensor signals that the vehicle crush zone is experiencing a high velocity change. The electronic sensor now realizes that this is a soft, deep penetration crash that requires an air bag according to a modified algorithm. The conditions for deploying the airbag can be modified based on this crush velocity information. In this manner, the combined system can be much smarter than either sensor acting alone. A low speed offset pole or car-to-car underride crash are common real world examples where the electronic sensor in the passenger compartment might trigger late without the information provided by the forward mounted crush zone sensor.

The crush zone sensor 910 can detect a reaction of the crush zone to the crash, e.g., crush of the crush zone, a velocity change of the crush zone or acceleration of the crush zone. That is, sensor 910 does not necessarily have to be one of the crush sensors disclosed above (or another sensor which triggers based on crush of the crush zone of the vehicle) but rather, can be designed to trigger based on other reactions of the crush zone to a crash, including the velocity change of the crush zone and the acceleration of the crush zone, as well as functions thereof (and combinations of any such reactions).

Figure 18A:
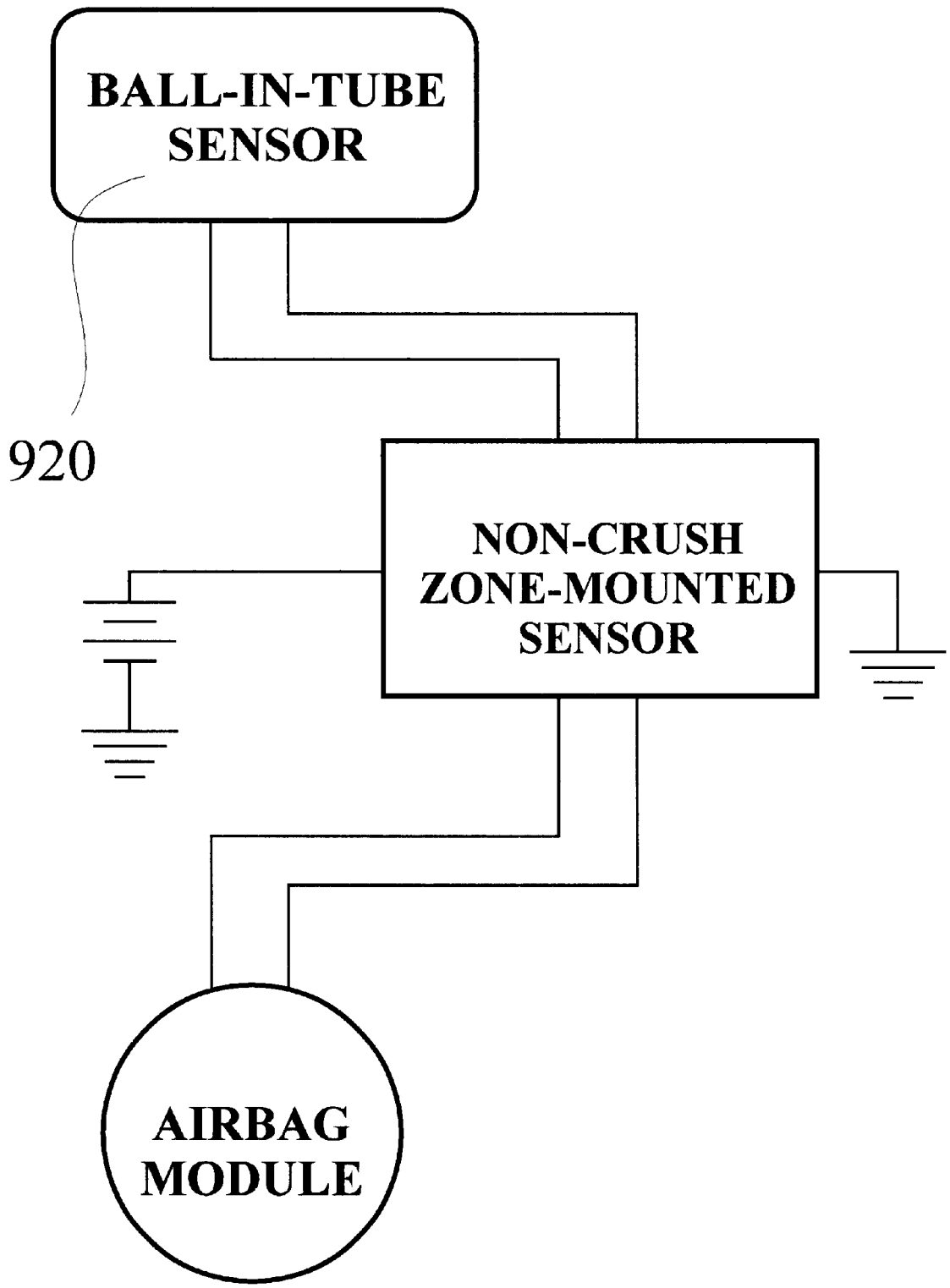
FIG. 18A is a circuit schematic showing a forward mounted ball-in-tube sensor used as an input to a crash sensor mounted outside of the crush zone.
Figure 18B:
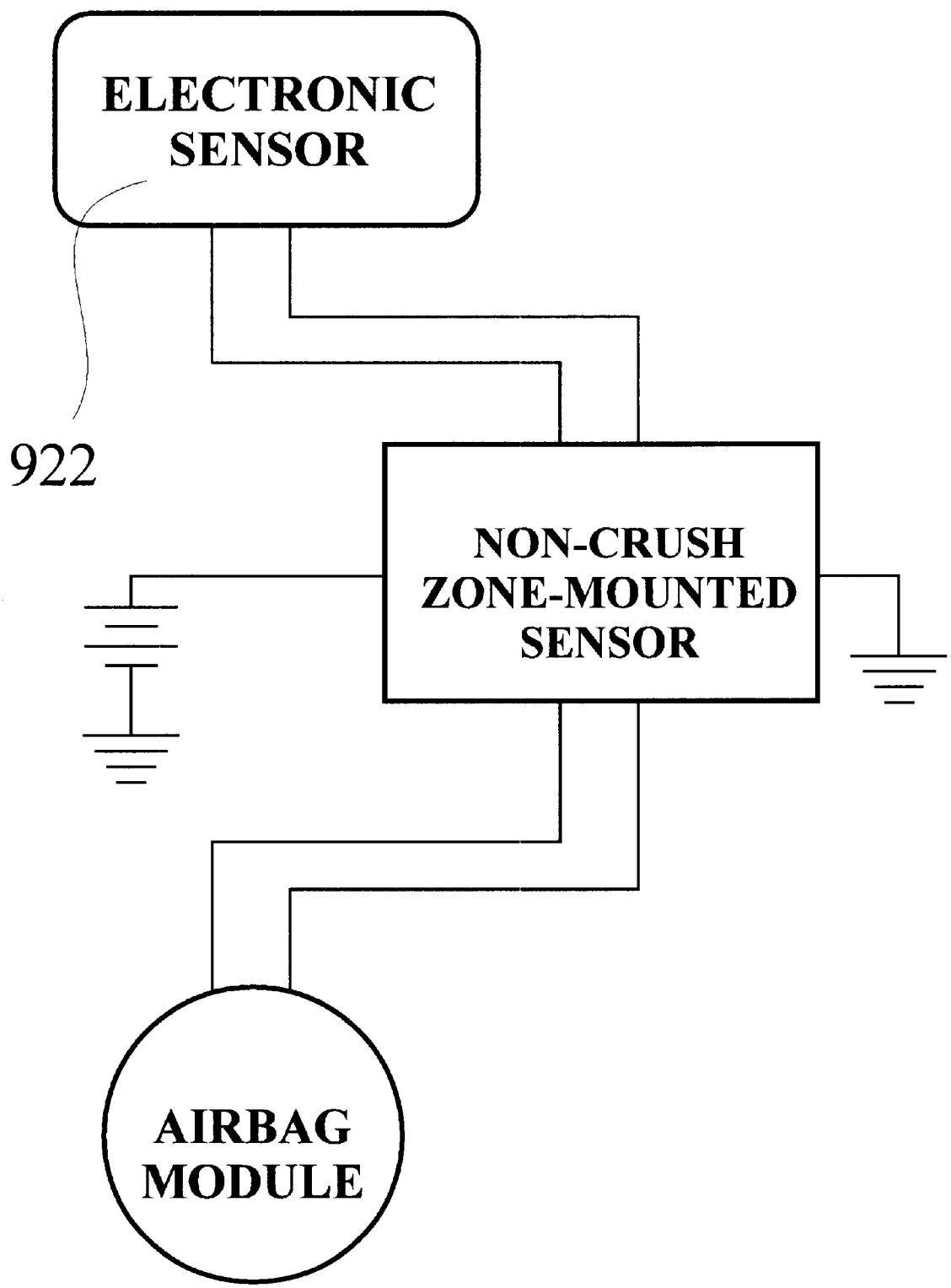

FIG. 18A shows a schematic circuit of an arrangement in accordance with the invention with a ball-in-tube sensor 920 as the crush zone sensor and FIG. 18B shows a schematic circuit of an arrangement in accordance with the invention with an electronic sensor 922 as the crush zone sensor In order to prevent seismic sensors, such as the ball-in-tube or accelerometer based sensors, from rotating in a crash, it has become. common to increase the strength of the radiator support or other structure on which the sensor is mounted. The sensor mounting bracket, however, must then permit the sensor to move relative to this structure complicating the bracket design or this structure must be weakly attached to the remainder of the vehicle so that the whole assembly will move in the crash. This added structural strength adds weight to the vehicle and is not needed for the sensor of this invention. It is even desirable for the sensor of this invention to be mounted on weaker structural members in order to enhance the chance for the structure to deform especially in soft crashes. The use of the rod-in-tube, coaxial cable or tape switch sensor of this invention, therefore, results in a weight saving for the vehicle that is very important with the increasingly stringent fuel economy standards mandated by the U.S. Government.

Operation of the crush zone crash sensor of this invention, as well as all others, can be critically affected by the material which is located between the sensor and the front of the vehicle and the geometry of this material as it crushes and comes back to strike the sensor. The sensors of the present invention are considerably more tolerant to variations in the geometry of this material for two reasons. Considering the compression mode, the length of the sensor can be increased so that the probably of it being impacted is very high. Alternately, in the bending mode, the sensor can be attached to two portions of the vehicle that are likely to experience relative motion during the crash. In this latter case, the two portions of the vehicle effectively become extensions of the sensor. In some cases, the radiator support structure is designed so that it will always deform at a particular location with the result that the sensor can be quite short since the entire radiator structure becomes an extension of the sensor. In other cases, such a location is not readily available and the sensor must be made longer to guarantee that it will be bent or compressed in a crash by crushed material coming from areas further forward in the vehicle.

The use of crush initiators is becoming increasingly common in vehicle design. These usually take the form of a hole, wrinkle, notch or bend intentionally placed in a structural member to cause the member to bend in a particular manner during a crash. As the sensor of the present invention is adapted to a particular vehicle, the use of crush initiators to control the manner in which the member, on which the sensor is mounted, bends will result in a shorter and more reliable sensor. Additional, usually minor, design modifications can also be used to permit the sensor to be mounted in protected locations so as to minimize the chance of sensor damage during vehicle maintenance.

The force required to cause sensor closure is an important design parameter of the sensor of this invention. In one typical design configuration, a 20 pound force on the sensor is required to move the front contact strip toward the rear member sufficiently to permit a velocity to be measured. This force is sufficient so that it is unlikely for the sensor to inadvertently provide a velocity indication sufficient to cause airbag deployment during vehicle maintenance, stone and some animal impacts and yet this force is quite low compared to the forces typically experienced during even marginal crashes.

The angle required to cause sensor closure is also an important parameter of the sensor of this invention. In one typical design configuration, a 15 degree bend angle of the sensor is required to move he front contact strip toward the rear member sufficiently to cause a false velocity reading indicative of a crash in the bending mode. This angle is sufficient so that it is unlikely for the sensor to inadvertently close during vehicle maintenance, stone and some animal impacts and yet this angle is quite low compared to the relative displacements and the angles that will occur in a sensor mounted on two locations which typically move relative to each other in even marginal crashes.

Thus, disclosed above is a crash sensor arrangement for determining whether the crash involving the vehicle requires deployment of the occupant restraint device comprises a first discriminating crash sensor mounted in a crush zone of the vehicle and structured and arranged to measure a reaction of the crush zone to the crash and a second discriminating crash sensor mounted outside of the crush zone of the vehicle and structured and arranged to trigger by means other than crush of the crush zone of the vehicle, e.g., based on acceleration or a change in velocity of the entire vehicle or a part thereof. Some typical reactions of the crush zone which are measured by the first discriminating crash sensor are the crush of the vehicle crush zone, acceleration of the vehicle crush zone, or velocity change of the vehicle crush zone. The first and second discriminating sensors are coupled to one another such that a signal to deploy the occupant restraint device is generated in consideration of the first sensor measurements and whether the second sensor has triggered. Thus, in certain crashes, the occupant restraint device will not deploy unless both sensors have been triggered, i.e., the conditions imposed on each crash sensor for deploying the occupant restraint device have been satisfied. In one embodiment, the sensors are coupled to one another in series such that the signal to deploy the occupant restraint device is generated only when the first and second sensors are both triggered. In another embodiment, the second sensor receives a signal indicative of triggering of the first sensor, considers whether to modify its triggering algorithm, triggering criteria and/or sensitivity based on the triggering or velocity change of the first sensor and if so, modifies the triggering algorithm, criteria or sensitivity. If the second sensor is an electronic sensor arranged to trigger based on a change in velocity and/or acceleration of the vehicle (or functions thereof), the velocity change and/or acceleration (or functions thereof) required for triggering may be modified based on the triggering of the first sensor. It should be noted though that such modification is not required in the event the velocity change is already appropriate. The first discriminating sensor mounted in the crush zone may be a tape crush sensor including a tape switch comprising a pair of electrically conductive members spaced apart from one another prior to crush of the vehicle and which are designed to come into contact with one another upon crush of the vehicle of a specific magnitude. The tape crush sensor can include means for reducing the sensitivity of the tape crush sensor, such as an encapsulating member around the sensor. The first discriminating sensor may also be a ball-in-tube sensor or an electronic sensor.

Another embodiment disclosed above of a crash sensor arrangement for determining whether the crash involving the vehicle requires deployment of the occupant restraint device comprises a first discriminating crash sensor mounted outside of the crush zone of the vehicle and structured and arranged to trigger by means other than crush of the crush zone of the vehicle, and a second discriminating crash sensor coupled to the first sensor and mounted in the crush zone of the vehicle, e.g., a tape crush sensor or an electronic sensor. The second sensor provides information about a reaction of the crush zone of the vehicle to the crash, e.g., information about crush, velocity or acceleration of the vehicle crush zone, to the first sensor such that the first sensor may affect and modify its triggering and/or sensitivity based on the information about crush, velocity or acceleration of the vehicle crush zone provided by the second sensor, if such modification is necessary.

The method for determining whether the crash involving the vehicle requires deployment of an occupant restraint device comprises the steps of mounting a first crash sensor in the crush zone of the vehicle, e.g., a tape crush or coaxial cable sensor or an electronic crash sensor, and which is triggered based on a reaction of the crush zone to the crash (e.g., crush, velocity change or acceleration, or a function thereof, of the vehicle crush zone), mounting a second crash sensor outside of the crush zone of the vehicle and which is triggered by means other than crush of the crush zone of the vehicle, and deploying the occupant restraint device in consideration of whether the first sensor has triggered and whether the second sensor has triggered. If the first and second sensors are coupled to one another in series, the occupant restraint device may be deployed only when the first and second sensors are both triggered (for certain types of crashes). In the alternative, a signal indicative of measurements made by the first sensor is directed to the second sensor and consideration is made as to whether the conditions for triggering of the second sensor should be affected and modified based on the measurements of the first sensor. If so, the triggering conditions are modified.

In another method disclosed above for determining whether a crash involving a vehicle requires deployment of an occupant restraint device, a first discriminating crash sensor is mounted outside of the crush zone of the vehicle and is triggered to deploy the occupant restraint device by means other than crush of the crush zone of the vehicle, and a second discriminating crash sensor is mounted in the crush zone of the vehicle such that the second sensor generates information about a reaction of the crush zone to the crash. As above, such reactions may be typically the crush, velocity change or acceleration of the vehicle crush zone. The second sensor may be a tape, rod-in-tube or coaxial cable crush sensor which provides information about the velocity change of the crush of the vehicle at the mounting location of the sensor or it may be an electronic sensor that uses the acceleration in the crush zone to determine sensor triggering. The information about the reaction of the crush zone of the vehicle to the crash is provided by the second sensor to the first sensor and deployment of the occupant restraint device is controlled via the first sensor based on the information about the reaction of the crush zone of the vehicle to the crash provided by the second sensor.

Also disclosed above is a vehicle crush detecting device in combination with a vehicle which comprises a sensor assembly consisting of a first elongated electrical conductor, a second elongated electrical conductor, and means for coupling the second electrical conductor to the first electrical conductor so that the first and second electrical conductors are parallel and substantially co-extensive to each other and thereby form the sensor assembly. The coupling means insulate the second electrical conductor from the first electrical conductor. Attachment means attach the sensor assembly to the vehicle at least two spaced apart positions. In use, when a portion of the vehicle crushes to contact the sensor assembly in the span between the at least two spaced apart locations, the sensor assembly crushes at the contact location causing the first electrical conductor to approach the second electrical conductor and the impedance there between changes as described above. The coupling means may comprise a header/connector assembly at one end of the sensor assembly. The first conductor may be a tube which is preferably deformable and the second conductor may be a rod arranged in the tube. Insulating means, e.g., round spacers, are positioned at at least two points between the first and second conductors for insulating the first conductor from the second conductor. The spacers extend only at discrete locations circumferentially between the first and second conductors. The first conductor may also be the outer conductor of a coax cable and the second conductor the inner conductor. The sensor assembly may be attached to the vehicle in a front region of the vehicle so as to detect crush velocity of the front region of the vehicle or at a rear of the vehicle so as to detect crush velocity of the rear of the vehicle. Also, the sensor assembly may be attached to the vehicle on a side of the vehicle so as to detect crush of the side of the vehicle. In this case, the sensor assembly can have an elongate portion attached in a position substantially parallel to a door panel in a door on the side of the vehicle. The header/connector assembly hermetically seals a space between the first and second conductors at one end thereof while the space between the conductors at the opposite end is closed. The header/connector assembly includes electrical connector pins electrically coupled to the first and second conductors and which have an exposed portion. The header/connector assembly also has a housing having an inlet port, a dam in the space between the first and second conductors and urethane or a silicone rubber compound around the ends of the first and second conductors. Header pins are connected to the first and second conductors and to the connector pins.

Moreover, disclosed above is a method for sealing a rod-in-tube device for mounting on a vehicle which comprises the steps of providing the device with a cavity having at least one inlet port and at least one narrow outflow passage, injecting a curable compound through the at least one inlet port such that the at least one narrow passage remains open during the injection process until the cavity is substantially full permitting air within the cavity to be displaced by the curable compound, the at least one passage being sufficiently narrow as to permit only a small amount of rubber compound to flow out of the cavity during the injection process, but large enough to permit air to easily flow out of the assembly, and curing the compound. When the device is a crush velocity detecting sensor in accordance with the invention comprising an electrically conductive tube and an electrically conductive rod arranged within the tube and spaced therefrom, the cavity is formed at least partially between the tube and the rod. Also, a plurality of cavities can be formed between discrete regions of the tube and the rod, separated by means of spacers, and connected through an aperture in the spacers to enable the injected curable compound to flow into each of the cavities.

The crush sensing crash sensor of this invention is ideally adapted for installation in the forward part of the crush zone for frontal, side and rear impacts of automobiles equipped with one or more inflatable passenger protective airbags. The term "airbag" has been used to mean all deployable passive passenger protective devices including airbags, seatbelts with tensioners and deployable nets. When the vehicle is subjected to a crash of sufficient magnitude as to require the deployment of the passive protective device, a portion of the vehicle is crushed until it contacts the sensor. At least a portion of the sensor deforms by bending or crushing due to the forces exerted on it by the material contacting it. In a preferred embodiment, the sensor is constructed from a long rod and a tube with the rod positioned in the center of the tube by means of insulating spacers or as a coaxial cable. When the tube bends, the spacing of the rod between the spacers approached the tube at a velocity that is representative of the crush velocity, which can be measured by the change in impedance between the rod and tube. The rod and tube assembly can be formed in any convenient geometry, as discussed above, during manufacture so as to conform to the possible mounting locations in the crush zone of the vehicle. In this manner, the sensor is placed in the proper position to catch all crashes to the vehicle for which it was designed regardless of where on the vehicle the impact takes place.

Other embodiments of the vehicle crush velocity detecting device in accordance with the invention include an electrically conducting, deformable tube, an electrically conducting rod positioned within the electrically conducting tube; and insulating means positioned at at least two points between the rod and the tube to insulate the rod from the tube. When the tube is deformed or bent by a force greater than a predetermined magnitude, e.g., by the crush of the vehicle proximate to or at the location at which the device is placed, it is forced to move closer to the rod. In a similar manner, the outer conductor of a coaxial cable is forced to move closer to the inner conductor. In use as a side impact crush velocity measuring system in order to deploy an occupant protection apparatus for protecting an occupant in a side impact, the device is mounted in a position at the side of the vehicle so as to detect crush velocity of the side of the vehicle and includes means for coupling the crush velocity detecting device and the occupant protection apparatus such that upon a threshold crush velocity the occupant protection device is deployed. To this end, the crush velocity detecting device has an elongate portion mounted in a position substantially parallel to a door panel in a door on the side of the vehicle. In another embodiment, the vehicle crash velocity sensor system comprises a crush velocity detecting device changeable from a higher impedance position indicative of a non-crush situation and a lower impedance position indicative of crush of a portion of the vehicle proximate to the device; and an electronic sensor coupled to the crush velocity detecting device and comprising an accelerometer, and means coupled to the accelerometer, e.g., a microprocessor having an algorithm, for initiating deployment of the occupant protection device based on a velocity change of the crush detecting device and an analysis of output from the accelerometer indicative of a situation in which deployment of the occupant protection device is desired. The crush velocity detecting sensor may comprise an electrically conducting, deformable tube; an electrically conducting rod positioned within the electrically conducting tube and insulating means positioned at at least two points between the rod and the tube to insulate the rod from the tube. It may also comprise a coaxial cable having an outer and an inner conductor.

Furthermore, disclosed above is a method for sealing a device for mounting on a vehicle, e.g., the crush velocity detecting device, comprising the steps of: assembling the device creating an enclosed cavity therein, injecting an uncured rubber compound through at least one inlet port of the cavity in such a manner that at least one narrow passage leading from the cavity to an exterior thereof remains open during the injection process until the cavity is substantially full permitting air within the cavity to be displaced by the rubber compound; the passage being sufficiently narrow as to permit only a small amount of rubber compound to flow out of the assembly during the filling process, but large enough to permit air to easily flow out of the assembly; and curing the rubber compound. When the device is a crush velocity detecting sensor, it may comprise an electrically conductive tube and an electrically conductive rod arranged within the tube and spaced therefrom in which case, the cavity is formed between the tube and the rod. Also, it is possible to form a plurality of cavities between discrete regions of the tube and the rod, separating the cavities by means of spacers, and connecting the cavities through an aperture in the spacers to enable the injected uncured rubber compound to flow into each cavity.

There has thus been shown and described an improved rod-in-tube crush velocity crash sensor which fulfills some if not all of the objects and advantages sought after.

More particularly, disclosed above is a vehicle crush detecting device in combination with a vehicle comprising an electrically conducting, deformable tube, an electrically conducting rod positioned within the tube, insulating means positioned at at least two points between the rod and the tube for insulating the rod from the tube and attachment means for attaching the tube to the vehicle at at least two spaced apart locations to provide at least one free, unrestrained span of the tube between the at least two spaced apart locations which is spaced away and not in contact with any portion of the vehicle. When the tube is deformed by a force greater than a predetermined magnitude during crush of the vehicle, the tube approaches the rod in response to the crush of the vehicle thereby, through monitoring electronics, the velocity of the crash can be determined. The rod and tube in the sensor may be unitary and the rod may substantially solid. The insulating means may comprise spacers extending circumferentially about the rod only at discrete locations in the tube. Mounting means may be provided for mounting the crush detecting device in a front, side and/or rear regions of the vehicle so as to detect crush of the vehicle in any of these regions. If the vehicle includes a deployable occupant protection apparatus for protecting an occupant in a side impact, mounting means may be provided for mounting the crush detecting device in a side of the vehicle so as to detect the crush velocity of the side of the vehicle. Also, the crush detecting device is coupled to the occupant protection apparatus such that upon completion of the electronic circuit, the occupant protection device is deployed. An electromechanical sensor having a moving mass or an electronic sensor can be coupled to the crush velocity sensor. The crush velocity detecting device may have an elongate portion mounted by the mounting means in a position substantially parallel to a door panel in a door on the side of the vehicle.

In another embodiment of the invention disclosed above, the vehicle crush detecting device in combination with a vehicle comprising an electrically conducting, deformable tube containing grease, an electrically conducting rod positioned within the tube and insulating means positioned at at least two points between the rod and the tube for insulating the rod from the tube. When the tube is deformed by a force greater than a predetermined magnitude during crush of the vehicle, it moves toward the rod during which time the crash velocity can be determined. Later it can contact the rod and thereby completing an electric circuit indicative of crushing of the vehicle. The tube is not completely filled with grease such that a few small voids are present in the tube to allow for differential expansion between the grease and the tube.

In another embodiment of the invention disclosed above, a vehicle crash sensor system comprises a crush velocity detecting sensor changeable from an open position indicative of a non-crush situation toward a closed position indicative of crush of a portion of the vehicle proximate to the sensor, an electronic sensor coupled to the crush velocity detecting sensor and comprising an accelerometer, and means coupled to the accelerometer for initiating deployment of the occupant protection device based on velocity of the crush velocity detecting sensor and an analysis of output from the accelerometer indicative of a situation in which deployment of the occupant protection device is desired. Means are provided for retaining the crush velocity detecting sensor in the closed position upon contact of the conducting members of the crush velocity detecting sensor from the open position to the closed position. The crush detecting switch may be mounted on a side of the vehicle so as to detect crush of the side of the vehicle.

In another embodiment of the invention disclosed above, a vehicle crush velocity detecting device in combination with a vehicle comprises an elongate, electrically conducting, deformable tube, the tube having an inner circumferential surface and an outer circumferential surface, an elongate, electrically conducting rod positioned within the tube and having an outer circumferential surface, attachment means for attaching the tube to the vehicle at at least two spaced apart locations to provide at least one free, unrestrained span of the tube between the at least two spaced apart locations which is spaced away and not in contact with any portion of the vehicle and insulating means positioned at at least two longitudinal points between the rod and the tube for insulating the rod from the tube, the insulating means being arranged to separate the entire outer circumferential surface of the rod from the entire inner circumferential surface of the tube around the entire outer circumference of the rod. As such, the tube is deformable by the crush of the vehicle about its entire circumference into contact with the rod. When the tube is deformed by a force greater than a predetermined magnitude during crush of the vehicle, it approaches the rod at a velocity indicative of the crash velocity which is measured by appropriate electronic circuitry and then contacts the rod thereby completing an electric circuit indicative of crushing of the vehicle.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. A vehicle having an occupant restraint device and a portion defined as a crush zone which is designed to crush upon a crash involving the vehicle, the vehicle including a crash sensor arrangement for determining whether the crash involving the vehicle requires deployment of the occupant restraint device, the arrangement comprising:

an elongate sensor arranged in the crush zone, said sensor being structured and arranged to provide a variable impedance as a function of a change in velocity of the crush zone; and a processor for measuring the impedance of said sensor or a part thereof at a plurality of times to determine changes in the impedance of said sensor or said part thereof, said processor providing a crash signal for consideration in the deployment of the occupant restraint device based on the determined changes in impedance of said sensor or part thereof.

2. The vehicle of claim 1, wherein said sensor has a U-shaped portion extending along both sides of the vehicle and across a front of the vehicle.

3. The vehicle of claim 1, wherein said sensor extends substantially between opposed longitudinal edges of a door of the vehicle.

4. The vehicle of claim 1, wherein said sensor comprises a coaxial cable, further comprising an electromagnetic wave generator for generating electromagnetic waves and feeding the waves into said cable.

5. The vehicle of claim 4, wherein said processor is embodied in an electronic control module coupled to said electromagnetic wave generator.

6. The vehicle of claim 4, wherein said electromagnetic wave generator is structured and arranged to feed electromagnetic waves into said cable having a wavelength on a same order as a length of said cable.

7. The vehicle of claim 1, wherein said sensor comprises parallel strips of conductive material spaced apart from one another in the absence of deformation of the crush zone and arranged to contact one another during deformation of the crush zone.

8. The vehicle of claim 7, wherein said contact strips are arranged to be compressed during deformation of the crush zone whereby such compression causes changes in impedance of said sensor.

9. A vehicle having an occupant restraint device and a portion defined as a crush zone which is designed to crush upon a crash involving the vehicle, the vehicle including a crash sensor arrangement for determining whether the crash involving the vehicle requires deployment of the occupant restraint device, the arrangement comprising a first discriminating crash sensor mounted outside of the crush zone of the vehicle and structured and arranged to trigger by means other than crush of the crush zone of the vehicle, and a second discriminating crash sensor coupled to said first sensor and mounted in the crush zone of the vehicle, said second sensor being structured and arranged to provide a signal representative of a velocity change of the crush zone during the crash to said first sensor, said first discriminating sensor being arranged to receive the signal representative of the velocity change of the crush zone of the vehicle to the crash from said second discriminating sensor, consider whether modification of triggering of said first discriminating sensor is necessary based on the velocity change of the crush zone of the vehicle to the crash provided by said second discriminating sensor and if modification is necessary, modify triggering of said first sensor.

10. The vehicle of claim 9, wherein said first discriminating sensor considers whether to modify its sensitivity based on the velocity change of the crush zone of the vehicle to the crash.

11. The vehicle of claim 9, wherein said first discriminating sensor is arranged to trigger based on a reaction of the entire vehicle or a part of the vehicle other than the crush zone of the vehicle to the crash.

12. The vehicle of claim 9, wherein said first discriminating sensor is a discriminating electronic sensor arranged to trigger based on at least one of acceleration of the vehicle and a change in velocity of the vehicle.

13. The vehicle of claim 12, wherein said first discriminating sensor is structured and arranged to consider whether modification of the at least one of the acceleration and velocity change required for triggering is necessary based on the velocity change of the crush zone of the vehicle to the crash and if modification is necessary, modify the triggering requirements.

14. The vehicle of claim 9, wherein said second discriminating sensor has a U-shaped portion extending along both sides of the vehicle and across a front of the vehicle.

15. The vehicle of claim 9, wherein said sensor extends substantially between opposed longitudinal edges of a door of the vehicle.

16. The vehicle of claim 9, wherein said second discriminating sensor is elongate and structured and arranged to provide a variable impedance as a function of the change in velocity of the crush zone, the signal representative of the velocity change of the crush zone being based on the change in impedance.

17. The vehicle of claim 16, further comprising a processor for measuring the impedance of said second discriminating sensor or a part thereof at a plurality of times to determine changes in the impedance of said second discriminating sensor or said part thereof.

18. The vehicle of claim 16, wherein said second discriminating sensor comprises a coaxial cable, further comprising an electromagnetic wave generator for generating electromagnetic waves and feeding the waves into said cable.

19. The vehicle of claim 18, wherein a processor is embodied in an electronic control module coupled to said electromagnetic wave generator.

20. The vehicle of claim 18, wherein said electromagnetic wave generator is structured and arranged to feed electromagnetic waves into said cable having a wavelength on a same order as a length of said cable.

21. The vehicle of claim 9, wherein said second discriminating sensor comprises parallel strips of conductive material spaced apart from one another in the absence of deformation of the crush zone and arranged to contact one another during deformation of the crush zone.

22. The vehicle of claim 21, wherein said contact strips are arranged to be compressed during deformation of the crush zone whereby such compression causes changes in impedance of said second discriminating sensor.

* * * * *